United States Patent [19]

Imanaka

[11] Patent Number: 5,629,597
[45] Date of Patent: May 13, 1997

[54] CONTROL UNIT FOR INDUCTION MOTOR AND CONTROL METHOD THEREFOR

[75] Inventor: Akira Imanaka, Nagoya, Japan

[73] Assignee: Mitsubishi Denki Kabushiki Kaisha, Tokyo, Japan

[21] Appl. No.: 495,107

[22] Filed: Jun. 27, 1995

[30] Foreign Application Priority Data

Jun. 30, 1994 [JP] Japan .................. 6-182729
Mar. 24, 1995 [JP] Japan .................. 7-066351

[51] Int. Cl.$^6$ ............................... H02P 5/408
[52] U.S. Cl. ............................ 318/805; 318/808
[58] Field of Search .......................... 318/802, 804, 318/805, 806, 807, 808, 812, 809, 798, 799

[56] References Cited

U.S. PATENT DOCUMENTS

| 4,019,131 | 4/1977 | Yamada | 318/653 |
| 4,767,976 | 8/1988 | Mutoh et al. | 318/808 |
| 4,780,658 | 10/1988 | Koyama . | |
| 4,843,296 | 6/1989 | Tanaka | 318/801 |
| 5,475,293 | 12/1995 | Sakai et al. | 318/802 |

FOREIGN PATENT DOCUMENTS

| 3026202 | 2/1982 | Germany . |
| 3034275 | 4/1982 | Germany . |
| 59-21293 | 2/1984 | Japan . |
| 61-62392 | 3/1986 | Japan . |
| 62-135288 | 6/1987 | Japan . |
| 1206888 | 8/1989 | Japan . |
| 2299493 | 12/1990 | Japan . |
| 3245789 | 11/1991 | Japan . |
| 4261384 | 9/1992 | Japan . |
| 530792 | 2/1993 | Japan . |
| 2190805 | 11/1987 | United Kingdom . |
| 2261966 | 6/1993 | United Kingdom . |

OTHER PUBLICATIONS

J. Fetz, "Parameter Adaptation For a Field Oriented Induction Machine Fed by a PWM–Inverter and Determination of the Fundamental Currents in the Range of Overmodulation", Firenze, vol. 2, pp. 138–144 (1991).

R. Weinman, "Maschinenparameter–Einstellung und Deren Adaption Bei Einem Asynchronmaschinenantrieb Mit Spannungszwischenkreisumrichter", (1991), issues No. 3, 4, pp. 72–94.

Primary Examiner—John W. Cabeca
Attorney, Agent, or Firm—Sughrue, Mion, Zinn, Macpeak & Seas

[57] ABSTRACT

A control unit for an induction motor which detects a primary current in an induction motor, obtains an error current which becomes zero when an actual value of the primary magnetic flux coincides with a set value provided as a product of $I_{1d}{}^*$ and a primary self inductance $L_1$, executes correction of the primary resistance, primary self-inductance, and leak factor according to the error current. Furthermore, the control unit has a correcting section control circuit in which a set error most influential for effecting coincidence between the primary magnetic flux in the induction motor with the primary magnetic flux is preferentially corrected.

12 Claims, 30 Drawing Sheets

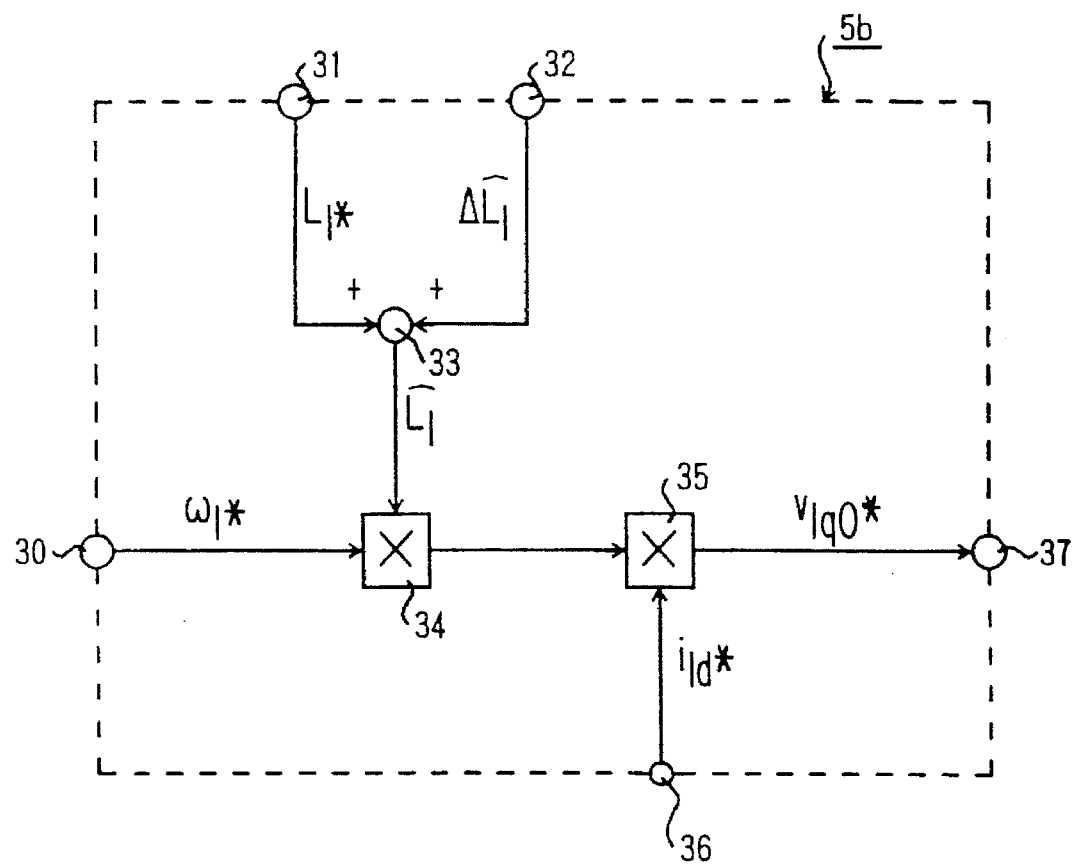
F I G. 2

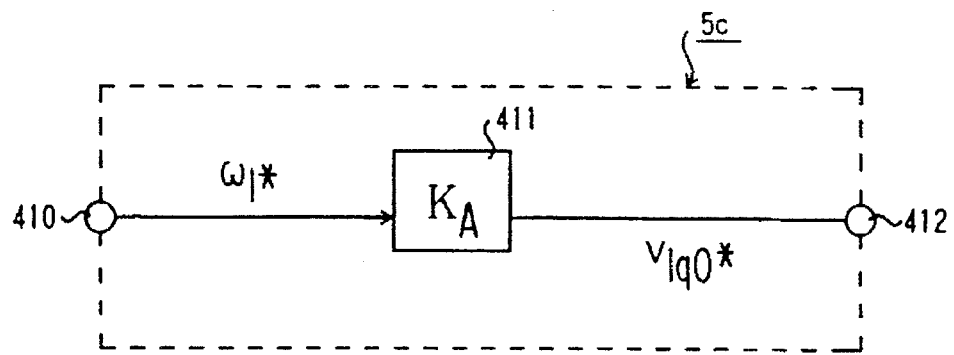
F I G. 2 7
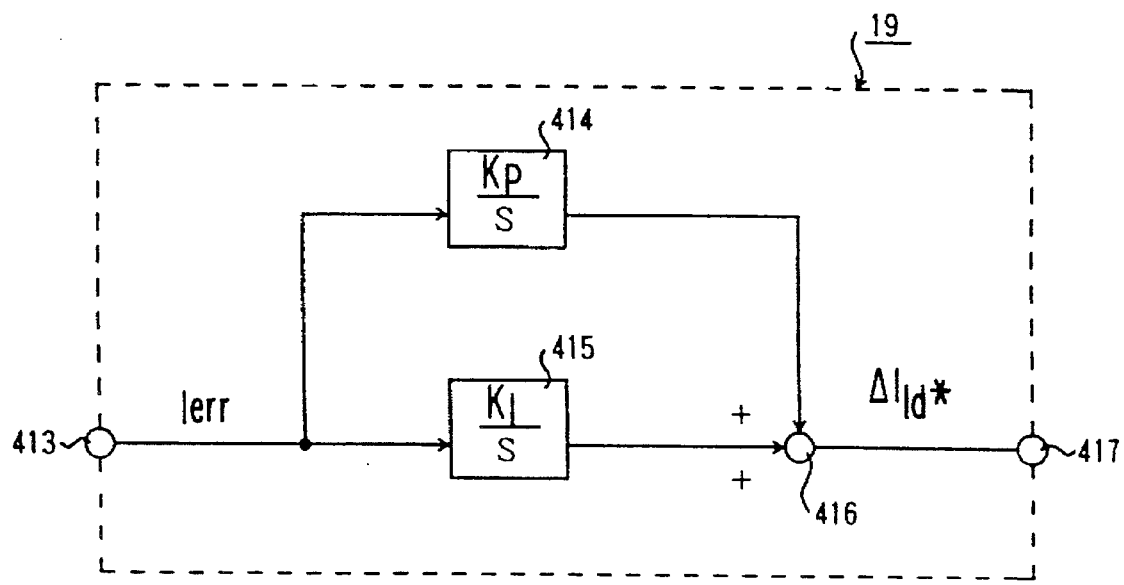
F I G. 2 8

PATTERN INCLUDING VOLTAGE DROP
IN ACCORDANCE WITH R

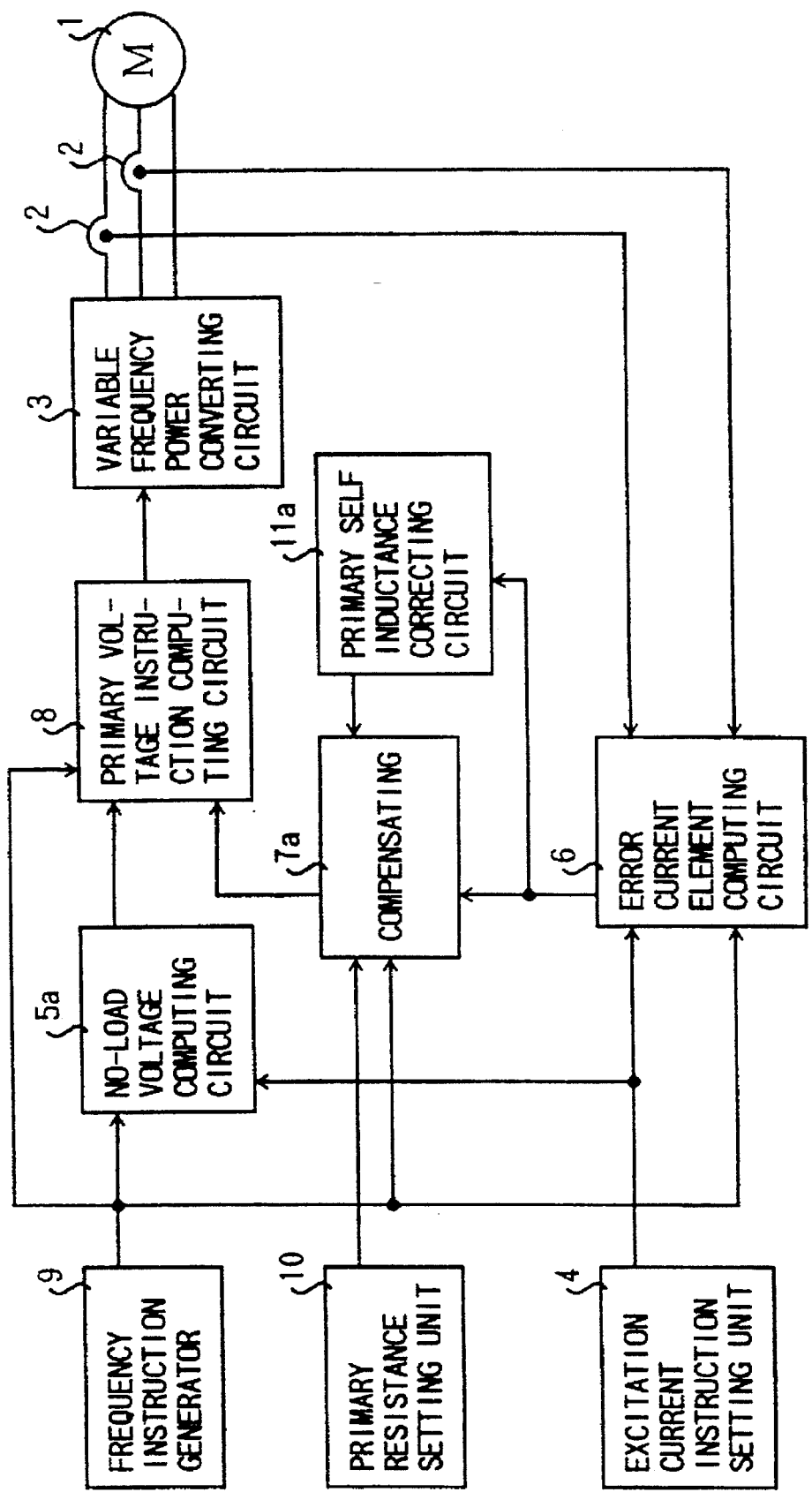

CONTROL UNIT FOR INDUCTION MOTOR AND CONTROL METHOD THEREFOR

FIELD OF THE INVENTION

The present invention relates to a control unit and control method therefor for controlling a primary frequency of an induction motor. More particularly, the invention relates to a control unit for an induction motor and control method therefor which corrects a control constant or a circuit constant of an induction motor.

BACKGROUND OF THE INVENTION

A conventional control unit of the same general type to which the invention relates is shown in FIG. 30. In this figure, designated at reference numeral 1 is an induction motor, at 26 a transistor inverter circuit for driving the induction motor 1 at a variable frequency, at 22 a frequency instruction generator, at 23 a function generator, at 24 a first voltage instruction generating circuit, and at 25 a PWM circuit.

The principles of frequency control in an induction motor with the control unit described above will now be discussed.

FIG. 31 is a T-type equivalent circuit for one phase of a known induction motor. In this figure, $R_1$ indicates a primary resistance, $R_2$ a secondary resistance, $l_1$ a primary leak inductance, $l_2$ a secondary leak inductance, M a primary secondary mutual inductance, $\omega_1$ a primary frequency, $\omega_s$ a slip frequency, $V_1$ a primary voltage, $E_0$ a gap inductive voltage, $I_1$ a primary current, and $I_2$ a secondary current.

The gap magnetic flux $\Phi_0$ is determined by the inductive voltage $E_0$ and the primary frequency $\omega_1$, and as time integration of the voltage indicates magnetic flux, equation (1) is established:

$$\Phi_0 = E_0/\omega_1 \tag{1}$$

A current $I_{2r}$, which acts on this magnetic flux $\Phi_0$ and generates a torque is an effective element of a secondary current $I_2$, namely the same phase element of the inductive voltage $E_0$. Accordingly, $I_{2r}$ is given by equation (2), as shown in FIG. 31.

$$I_{2r} = \frac{R_2 E_0}{R_2^2 + \omega_s^2 l_2^2} \cdot \frac{\omega_s}{\omega_1} \tag{2}$$

The torque $T_e$ generated by an induction motor is proportional to the product of the magnetic flux $\Phi_0$ and the current $I_{2r}$, so that equation (3) may be written as follows:

$$T_e = K \Phi_0 I_{2r} \tag{3}$$

Herein, K is proportional constant.

Equation (4) is obtained by substituting equations (1) and (2) into equation (3):

$$T_e = K \left( \frac{E_0}{\omega_1} \right)^2 \cdot \frac{\omega_s R_2}{R_2^2 + \omega_s^2 l_2^2} \tag{4}$$

From equation (4), when $E_0/\omega_1$ is kept at a constant value, the generated torque $T_e$ changes according to the slip frequency $\omega_s$. In this step, the maximum torque $T_{max}$ is obtained by differentiating equation (4) with respect to the slip frequency $\omega_s$ and setting the numerator at zero. Namely the maximum torque is obtained by equation (5):

$$T_{max} = K \left( \frac{E_0}{\omega_1} \right)^2 \cdot \frac{1}{2l_2} \tag{5}$$

For this reason, the maximum torque $T_{max}$ has no effect on $\omega_1$ if $E_0/\omega_1$ is kept at a constant value.

In practice, however, as the inductive voltage $E_0$ cannot easily be detected, generally a so-called V/F constant control system is employed in which the primary voltage $V_1$ is made proportional to $\omega_1$ to make the value of $V_1/\omega_1$ constant.

In this case, in an area where the primary frequency $\omega_1$ is low, the voltage drop due to the primary resistance $R_1$ cannot be ignored in relation to the primary voltage $V_1$, so that $V_1$ is made larger beforehand by a voltage value equivalent to $R_1 I_1$ in the low frequency area.

Next, a description will be given of operations of the control unit shown in FIG. 30.

For the reasons described above, the primary frequency instruction $\omega_1^*$ outputted from the frequency instruction generator 22 is provided as an input, based on the functional relation indicated by the solid line in FIG. 32, to the function generator 23, which outputs an amplitude instruction $V_1^*$ of the primary voltage.

Then, the primary voltage instruction generating circuit 24 executes computation employing equation (6) with the amplitude instruction $V_1^*$ for the primary voltage and the primary frequency instruction $\omega_1^*$, and outputs the primary voltage instructions $V_{1u}^*$, $V_{1v}^*$, and $V_{1w}^*$ to the first respective coils of the induction motor 1.

$$V_{1u}^* = V_1^* \cos \omega_1^* t$$

$$V_{1v}^* = V_1^* \cos (\omega_1^* t - 2\pi/3)$$

$$V_{1w}^* = V_1^* \cos (\omega_1^* t + 2\pi/3) \tag{6}$$

Then, the PWM circuit 25 generates a base signal for controlling ON/OFF operations of a transistor (not shown) constituting a transistor inverter circuit 26 corresponding to the primary voltage instructions $V_{1u}^*$, $V_{1v}^*$, $V_{1w}^*$, and as a result the primary voltages $V_{1u}$, $V_{1v}$, $V_{1w}$ actually fed to the induction motor 1 are controlled so that they follow the respective instructions. For this reason, the frequency of the induction motor 1, namely, the rotational speed thereof, can be controlled according to the primary frequency instruction $\omega_1$.

In a control unit for the conventional induction motor constructed and arranged as described above, if it is necessary to generate a large torque when running at a low speed, the primary voltage instruction $V_1^*$ must be set to a value higher enough to compensate a voltage drop, as shown in FIG. 28, to correct the voltage drop due to the primary resistance $R_1$.

However, the primary resistance $R_1$ changes according to a temperature, so that it is very difficult to accurately compensate the voltage drop. For this reason, when the voltage increase introduced to compensate the voltage drop as described above is smaller than the actual voltage drop, if a load torque is constantly applied to the induction motor, the torque generated when running at a low rotational speed becomes insufficient to the extent that the induction motor cannot be started. To the contrary, if the voltage increase introduced to compensate the voltage drop is too large, operation of the inverter circuit must be stopped to protect the inverter circuit from damage caused by an overcurrent due to a large primary current when running at a low rotational speed, which is very disadvantageous.

Also, even if the generated torque is constant, when the machine driven by an induction motor is changed, the total moment of inertia is different, so that the rate of change of rotational speed of the induction motor becomes different. For this reason, unless the rate of change of the primary frequency instruction $\omega_1$ is properly adjusted, acceleration or deceleration of the induction motor cannot be performed correctly according to $\omega_1^*$, and sometimes a large primary current may flow therein, so that operation of the inverter circuit must be stopped to protect the inverter circuit from overcurrent.

In order to solve the problems mentioned above, the present inventor proposed a control unit for an induction motor (Japanese Patent Laid-Open Publication No. 30792/1993) which does not encounter problems such as torque shortage or overcurrent, even if the value of the primary resistance $R_1$ in the induction motor changes because of temperature, and which does not depend on the rate of change of the machine driven by the induction motor or on the primary frequency instruction $\omega_1^*$, and which can always properly control the rotational speed of an induction motor under stable conditions.

Also, Japanese Patent Laid-Open No. 299493/1990 discloses a method for correcting a primary resistance set value. In this conventional approach, a secondary interlinkage magnetic flux is computed from a voltage and current in a motor as detected by a voltage sensor and a current sensor. The primary resistance value is corrected according to the amount of amplitude deviation between the instruction value and the computed value.

However, in this conventional approach, the voltage drop in the primary circuit is subtracted from a voltage at a terminal of the motor, and the difference is integrated with time to obtain the secondary interlinkage magnetic flux. Because of this integration with time, an accurate motor voltage is required, which means that a separate voltage sensor must be provided, which is disadvantageous. For this reason, a control method not requiring a means for computing a magnetic flux such as a secondary magnetic interlinkage magnetic flux is necessary.

FIG. 33 is a block diagram illustrating the general configuration of the above-described control unit for an induction motor (Japanese Patent Laid-Open Publication No. 30792/1993). In FIG. 33, designated at reference numeral 2 is a current detector which detects a primary current flowing in the induction motor 1, at 3 a variable frequency power exchange circuit provided in a stage before the induction motor 1, at 4 an excitation current instruction setting unit which sets up an excitation current in the induction motor 1, at 5a a no-load voltage computing circuit connected to the excitation current instruction setting unit 4 as well as to a frequency instruction generator 9 and outputting a no-load voltage instruction, at 6 an error current element computing circuit connected to the current detector 2, excitation current instruction setting unit 4 and the frequency instruction generator 9, computing primary current elements each having a phase different by 90 degrees from the other from the primary current in the induction motor 1 and the primary frequency instruction value, and furthermore computing an error current based on the excitation current instruction value and the primary current, at 7a a compensating voltage computing circuit connected to the error current element computing circuit 6, the frequency instruction generator 9, the primary resistance setting unit 10 and a primary resistance correction voltage circuit 11a and computing a correction voltage, and at 8 a primary voltage instruction computing circuit connected to the correction voltage computing circuit 7a, the no-load voltage computing circuit 5a, and the frequency instruction generator 9 and outputting a primary voltage instruction based on the no-load voltage instruction and the correction voltage.

Next a description will be given of the operations of this circuit.

A no-load voltage instruction $V_{1q0}^*$ is computed by the no-load voltage computing circuit 5a from $L_1^*$, a predetermined value of the primary self-inductance previously set in a factor setting unit inside the no-load voltage computing circuit, an excitation current instruction $I_{1d}^*$ inputted from the excitation current instruction setting unit 4, and a primary frequency instruction $\omega_1^*$ inputted from the frequency instruction generator 9 using equation (7), and is outputted to the primary voltage instruction computing circuit 8.

$$V_{1q0}^* = L_1^* \omega_1^* I_{1d}^* \qquad (7)$$

The primary currents $I_{1u}$ and $I_{1v}$ in the induction motor 1 detected by the current detector 2 are converted on the rotating coordinate system (d-q coordinate system) rotating according to the primary frequency instruction $\omega_1^*$ and obtained as d-axis and q-axis elements $I_{1d}$ and $I_{1q}$ of the primary current above. Furthermore, the error current element $I_{err}$ is computed using equation (8) so that an actual value of the primary magnetic flux generated inside the induction motor 1 becomes zero when it coincides with an instruction value for the primary magnetic flux provided as a product of the excitation current instruction $I_{1d}^*$ and the primary self-inductance $L_1$ in the induction motor 1 from the above values $I_{1d}$ and $I_{1q}$, a leak factor predetermined value $\sigma^*$ which is an equivalent circuit constant for the induction motor 1 previously set up in the factor setting unit inside the error current element computing circuit 6, and the excitation current instruction $I_{1d}^*$ outputted from the excitation current instruction setting unit 4.

$$I_{err} = I_{1d}^* - I_{1d} + \sigma^* I_{1q}^2 / (I_{1d}^* - \sigma^* I_{1d}) \qquad (8)$$

Here, $\sigma^*$, which is a leak factor predetermined value for the induction motor 1, is computed using equation (9) from $L_1^*$ which is a predetermined value for the primary self-inductance $L_1$ for the induction motor 1, $L_2^*$ which is a predetermined value for the second self-inductance $L_2$, and $M^*$ which is a predetermined value for the primary/secondary mutual inductance M, and is set up as a factor for a factor setting unit inside the error current element computing circuit 6.

$$\sigma^* = 1 - (M^*)^2 / (L_1^* L_2^*) \qquad (9)$$

Then, the error current element $I_{err}$ outputted from the error current element computing circuit 6 above is computed by the primary resistance correcting circuit 11a using equation (10) and outputted as a correction value $\Delta \hat{R}_1$ for the primary resistance predetermined value $R_1^*$.

$$\Delta \hat{R}_1 = (K_{RP} + K_{RI}/S) I_{err} \qquad (10)$$

Here, $K_{RP}$ is a proportional gain and $K_{RI}$ is an integration gain.

Then correction voltage elements $\Delta V_{1d}$, $\Delta V_{1q}$ for the d axis and q axis making the error current element $I_{err}$ closer to zero are outputted. Namely, the primary resistance predetermined value $R_1^*$ inputted from the primary resistance setting unit 10 is added to the correction value $\Delta \hat{R}_1$ for the primary resistance predetermined value $R_1^*$ inputted from the primary resistance correcting circuit 11a to make up the primary resistance estimated value $\hat{R}_1$, and the correction voltage element $\Delta V_{1d}$ for the d axis and the correction value element $\Delta V_{1q}$ for q axis are computed using equation (11) below using the d-axis element $I_{1d}$ of the primary current, q-axis element $I_{1q}$ of the primary current, error current element $I_{err}$, each of which is inputted from the error current element computing circuit 6, and the primary frequency instruction $\omega_1^*$ inputted from the frequency instruction generator 9 and the correction voltage elements computed as described are outputted.

$$\Delta V_{1d} = \hat{R}_1 I_{1d} + K_{cd} I_{err}$$

$$\Delta V_{1q} = \hat{R}_1 I_{1q} + (K_0 \omega_1^* + K_{cq}) I_{err} \quad (11)$$

Here, $K_{cd}$, $K_{cq}$, and $K_0$ are proportional gains each previously set in a factor setting unit inside the correction voltage computing circuit 7a.

Then the primary voltage instructions $V_{1u}^*$, $V_{1v}^*$ and $V_{1w}^*$ are provided from the primary voltage instruction computing circuit 8. Namely the d-axis and q-axis element instructions $V_{1d}^*$, $V_{1q}^*$ are computed using equation (12) below using the d-axis and q-axis correction voltage elements $\Delta V_{1d}$, $\Delta V_{1q}$ inputted from the correction value computing circuit 7a and the no-load voltage instruction $V_{1q0}^*$ inputted from the no-load voltage computing circuit 5a, and the element instructions computed as described above are outputted. Furthermore the d-axis and q-axis element instructions $V_{1d}^*$, $V_{1q}^*$ of the primary voltage are converted to the primary voltage instructions $V_{1u}^*$, $V_{1v}^*$ and $V_{1w}^*$ by the primary voltage instruction computing circuit 8 using the primary frequency instruction $\omega_1^*$ inputted from the frequency instruction generator 9, and are outputted.

$$V_{1d}^* = \Delta V_{1d}$$

$$V_{1q}^* = \Delta V_{1q} + V_{1q0}^* \quad (12)$$

Then, when the primary voltage instructions $V_{1u}^*$, $V_{1v}^*$ and $V_{1w}^*$ are inputted into the variable frequency power converting circuit 3, the actual value of the primary current imposed on the induction motor 1 is controlled so that the primary voltage will follow the primary voltage instruction values.

In addition to the above, reference may be made to Japanese Patent Laid-Open No. 299493/1990 disclosing an induction motor controlling method, Japanese Patent Laid-Open No. 245789/1991 disclosing an induction motor vector controlling method, Japanese Patent Laid-Open No. 261384/1992 disclosing a torque control inverter controlling method and apparatus for the purpose, the Japanese Patent Laid-Open No. 135288/1987 disclosing an induction motor magnetic vector computing device, Japanese Patent Laid-Open No. 206888/1989 disclosing an induction motor controller, Japanese Patent Laid-Open No. 21293/1984 disclosing an induction motor torque controller, and Japanese Patent Laid-Open No. 62392/1986 disclosing an induction motor vector controller.

The control unit (as disclosed in Japanese Patent Laid-Open No. 30792/1993) for an induction motor developed to overcome the problems in the conventional types of control units for induction motors is constructed as described above, so that, if $R_1^*$, $L_1^*$, and $\sigma^*$ which are predetermined values for the primary resistance $R_1$, a circuit constant for an induction motor, primary self-inductance $L_1$, leak factor $\sigma$ ($=1-M^2/(L_1 L_2)$) and the like are equal to the true values, the control unit operates so that the actual value of the primary magnetic flux generated inside the induction motor coincides with the product of the excitation current instruction current and the primary self-inductance for the induction motor, and for this reason torque shortage or overcurrent does not occur, and the rotational speed of the induction motor can always be controlled under stable conditions.

In this control unit for an induction motor, rotational constants for the induction motor, namely the primary resistance $R_1$, primary self-inductance $L_1$, leak factor $\sigma$ ($=1-M^2/(L_1 L_2)$) and the like can generally be obtained from a design specification for the induction motor, or through a constant measurement test such as a resistance measurement test, a lock test, or a no load test. However, among induction motors manufactured according to the same design specification, sometimes the circuit constants may vary significantly due to variations in the manufacturing process. In such a case, or if the design specifications cannot be obtained, it is necessary to carry out a constant measurement test for each individual induction motor to be operated.

Also, sometimes an induction motor is not operated under a normal and constant excitation current instruction, but may be controlled by changing the excitation current instruction such as variable excitation, or weak excitation, but in this case in some induction motors the primary self-inductance may change significantly due to magnetic saturation. Herein, if the predetermined value for the primary self-inductance is different from the true value, a constant deviation will be generated in the error current element $I_{err}$ specified by equation (8). In a case where a large constant deviation of the error current element $I_{err}$ is generated due to an error in setting up the primary self-inductance, sometimes the output voltage may be smaller than the ideal value, which may in turn result in a torque shortage. For this reason, in this control unit for an induction motor, sometimes it is required to carry out a very complicated process such as determining the primary self-inductance change curve and storing the measured values.

Furthermore, in case of a completely closed slot-type induction motor, if the primary and secondary currents are large, sometimes magnetic saturation may occur, which may in turn cause substantial changes in the leak factor. Herein, if the predetermined value of the leak factor is largely different from the true value, especially when the load is heavy, a large constant deviation occurs the error current element $I_{err}$ given by equation (8). If this constant deviation of the error current element $I_{err}$ is largely on the negative side, sometimes the correction voltage elements $\Delta V_{1d}$, $\Delta V_{1q}$ for the d axis and q axis given by equation (11) may become ideal values, which may in turn cause torque shortage. It is difficult to measure the change curve of the leak factor due to magnetic saturation, and with the control unit for an induction motor as proposed above, in a case where an induction motor, in which the leak factor changes significantly, is driven, the change curve for the leak factor cannot be stored, and the setting error may cause torque shortage.

It should be noted that, as far as the primary resistance is concerned, the correction can be made properly even with the control unit proposed above, and excellent control can be achieved in straight power driving, which is the most common driving state. However, no consideration has been given to the case of a regenerative load, so that, in a case where a specific load requiring a large and low-speed regenerative torque is required, for instance, in the case of driving an elevator or the like, sometimes a torque shortage still may occur.

Further, Japanese Patent Laid-Open Publication No. 299493/1990 discloses an inductive motor controlling method for correcting the primary resistance predetermined value. In this controlling method, a secondary interlinkage magnetic flux is computed from a voltage and a current in the motor detected by a voltage sensor and a current sensor, respectively, and the primary resistance value is corrected according to the amount of amplitude deviation between the instruction value and the computed value. However, in the conventional approach described above, the voltage drop in the primary circuit is subtracted from the terminal voltage of the motor, and the difference is subjected to time integration, thus the secondary interlinkage magnetic flux being computed. To carry out the integration, an accurate motor voltage value is required, and for that purpose a voltage sensor is indispensable, which is disadvantageous. For this reason, it is necessary to employ a controlling method not requiring a computing device for computing magnetic flux such as the secondary interlinkage magnetic flux.

SUMMARY OF THE INVENTION

It is a first object of the present invention to provide a control unit for an induction motor and a control method therefor in which torque shortage or overcurrent do not occur, and which can control the rotational speed of an induction motor always with high precision and under stable conditions, even if set values for circuit constants for an induction motor such as the primary resistance $R_1$, primary self-inductance $L_1$, leak factor $\sigma$ $(=1-M^2/(L_1L_2))$ are different from the actual values.

It is a second object of the present invention to provide a control unit for an induction motor and control method therefor in which torque shortage or overcurrent do not occur, and which can always control the rotational speed of an induction motor with high precision and under stable conditions, even when control by changing an excitation current instruction such as variable excitation or weak excitation is employed, by automatically correcting the value of the primary self-inductance, which changes due to magnetic saturation.

Furthermore it is a third object of the present invention to obtain a control unit for an induction motor and control method therefor in which torque shortage or overcurrent do not occur, and which can control the rotational speed of an induction motor always with high precision and under stable conditions by automatically correcting the leak factor, which changes according to the primary current.

Also, it is a fourth object of the present invention to provide a control unit for an induction motor and control method therefor which can stably correct the primary resistance even in the case of a regenerative load, and in which torque shortage or overcurrent do not occur, and which can always control the rotational speed of an induction motor with high precision and under stable conditions, even when a load requiring a large and low speed regenerative torque, such as the load of an elevator, is applied.

In the control unit for an induction motor and control method therefor according to the present invention, primary current elements having phases differing by 90 degrees from each other are computed by primary current element computing means from the primary current and the primary frequency instruction value, an error current is outputted by the error current computing means using the primary frequency instruction value, excitation current instruction value, and output from the primary current element computing means so that the actual value of the primary magnetic flux generated inside the induction motor becomes zero when it coincides with the set value, and then a correction value for the set value for the primary self-inductance, which is a constant value for the induction motor is computed by the primary self-inductance correcting means from the error current. Furthermore a correction value which make the value of the error current closer to zero is computed by the correction voltage computing means using the primary frequency instruction value, output from the primary current element computing means, and also output from the primary current element computing means, a no-load voltage instruction value for the induction motor is outputted by the no-load voltage computing means using the primary frequency instruction value, excitation current instruction value, and output from the primary self-inductance correcting means, and the primary voltage instruction value for the induction motor is outputted by the primary voltage instruction value computing circuit means. Then the primary voltage imposed on the induction motor is controlled by the variable frequency power converting means so that it follows the primary voltage instruction value.

In the control unit for an induction motor and control method therefor according to the present invention, a no-load voltage for an induction motor is outputted by the no-load voltage correcting means, primary current elements having phases differing by 90 from each other are computed by the primary current element computing means from the primary current and the primary frequency instruction value, and an error current is outputted by the error current computing means using the primary frequency instruction value, excitation current instruction value and the output from the primary current element computing means, as well as the output from a leak factor correcting means, so that the actual value of the primary magnetic flux generated within the induction motor becomes zero when it coincides with the set value. Then, a correction value for a set value for the leak factor which is a circuit constant for the induction motor is computed by the leak factor correcting means from the error current. Furthermore, a correction voltage making the value of the error current closer to zero is computed by the correction value computing means using the primary frequency instruction value, output from the primary current computing means, and output from the error current computing means, and the primary voltage instruction value for the induction motor is outputted from the primary voltage instruction computing circuit means. Then, an actual value of the primary voltage loaded to the induction motor is controlled by the variable frequency power converting means so that it follows the primary voltage instruction value.

In the control unit for an induction motor and control method therefor according to the present invention, primary current elements having a phase by 90 degrees differing from each other are computed by the primary current element computing means from the primary current and the primary frequency instruction value, and an error current is computed by the error current computing means using output from the primary current element computing means, primary frequency instruction value, excitation current instruction value, and also output from a leak factor correcting means described later so that the actual value of the primary magnetic flux generated inside the induction motor will become zero when it coincides with the set value. Furthermore, correction values for the primary resistance set value, primary self-inductance set value, and leak factor set value, which are circuit constants for the induction motor, are computed and outputted by the primary resistance correcting means, primary self-inductance correcting means, and leak factor correcting means using the error current. Then, a correction voltage making the value of the error current closer to zero is outputted by the correction voltage computing means using the primary frequency instruction value, error current, the output from the primary current element computing means, and the primary resistance correction value, then the primary frequency instruction value, excitation current instruction value, and primary self-inductance correction value are inputted by the no-load voltage computing means with the no-load voltage instruction value for the induction motor outputted. Furthermore, the primary resistance correcting means, primary self-inductance correcting means, and the leak factor correcting means are controlled by a correcting section controlling means, and the primary voltage instruction value for the induction motor is outputted from the primary voltage instruction computing circuit means. Then an actual value of the primary voltage to be applied to the induction motor is controlled by the variable frequency power converting means so that it will follow the primary voltage instruction value.

In the control unit for an induction motor and control method therefor according to the present invention, the correcting section controlling means stops by using the primary frequency instruction value the operation for correcting the primary inductance or correcting the leak factor when the primary frequency instruction value is small, and stops the operation for correcting the primary resistance when the primary frequency instruction value is large.

In the control unit for an induction motor and control method therefor according to the present invention, the correcting section controlling means makes a determination as to a light load driving mode or a heavy load driving mode according to the output from the primary current element computing means, stops the operation for correcting the leak factor in the light load driving mode, and performs the operation for correcting the primary self-inductance in the heavy load driving mode.

In the control unit for an induction motor and control method therefor according to the present invention, the correcting section controlling means inverts the polarity of a correction gain for the primary resistance according to output from the primary current element computing means.

In the control unit for an induction motor and control method therefor according to the present invention, the correcting section controlling means effects control using the output from the primary frequency instruction means as well as from the primary current element computing means, correction gains for the primary resistance correcting means, primary self-inductance correcting means, and leak factor correcting means according to a gain function set previously.

In the control unit for an induction motor and control method therefor according to the present invention, primary current elements having phases differing by 90 degrees from each other are computed by the primary current element computing means from the primary current and the primary frequency instruction value, an error current is outputted by the error current computing means using the primary frequency instruction value, excitation current instruction value, and output from the primary current element computing means so that the actual value of the primary magnetic flux generated within the induction motor will become zero when it coincides with the set value, and then a correction value for the excitation current set value is computed by the excitation current instruction correcting means from the error current. Furthermore a correction voltage making the value of the error current closer to zero is computed by the correction voltage computing means using the primary frequency instruction value, output from the primary current element computing means, and also output from the error current computing means, a no-load voltage instruction value for the induction motor is outputted by the no-load voltage computing means from the primary frequency instruction value, and then the primary voltage instruction value for the induction motor is outputted by the primary voltage instruction computing circuit means. Then an actual value of the primary voltage to be loaded to the induction motor is controlled so that it will follow the primary voltage instruction value.

Other objects and features of this invention will become understood from the following description with reference to the accompanying drawings.

BRIEF DESCRIPTION OF THE DRAWINGS

FIG. 2 is a block diagram showing the general configuration of a no-load voltage computing circuit according to Embodiment 1;

FIG. 27 is a block diagram showing configuration of a no-load voltage computing circuit according to Embodiment 4;

FIG. 28 is a block diagram showing configuration of an excitation current instruction correcting circuit according to Embodiment 4;

FIG. 33 is a block diagram showing general configuration of a control unit for an induction motor previously proposed by the present inventor.

DESCRIPTION OF THE PREFERRED EMBODIMENTS

A detailed description will now be provided for embodiments of a control unit for an induction motor constructed according to the present invention.

At first, a description is provided of Embodiment 1 of the present invention.

Figure 1:
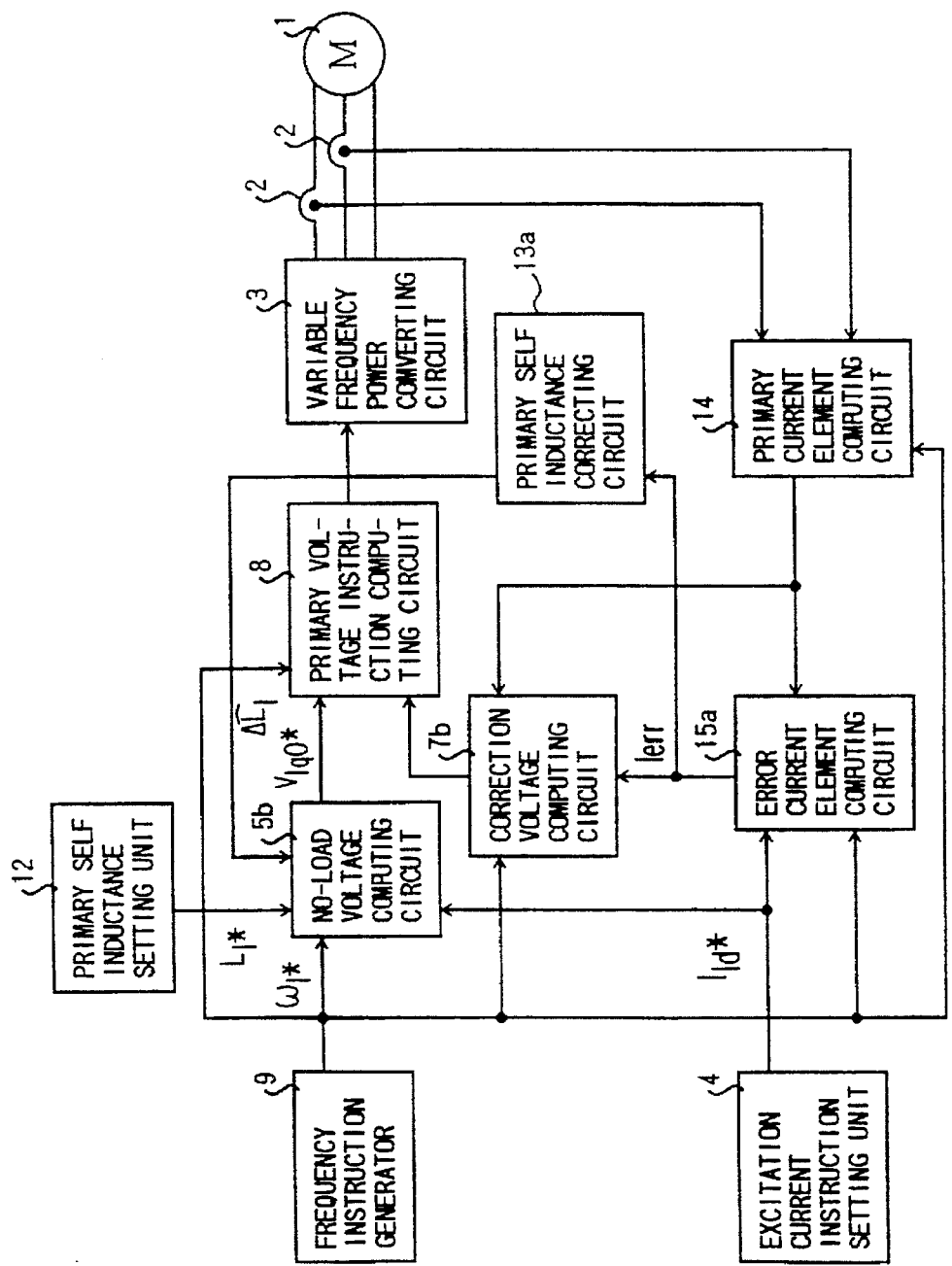
FIG. 1 is a block diagram showing the general configuration of a control unit for an induction motor according to Embodiment 1 of the present invention.

FIG. 1 is a block diagram showing the general configuration of Embodiment 1 of the present invention. In this figure, designated at reference numeral 1 is an induction motor, at 2 a current detector, at 3 a variable frequency power converting circuit, at 4 an excitation current instruction setting unit, at 5b a no-load voltage computing circuit, at 7b a correction voltage computing circuit, at 8 a primary voltage instruction computing circuit, at 9 a frequency instruction generator, at 12 a primary self-inductance setting unit, at 13a a primary self-inductance correcting circuit, at 14 a primary current element computing circuit, and at 15a an error current element computing circuit.

FIG. 2 is a block diagram showing the detailed configuration of the no-load voltage computing circuit 5b described above. In this figure, the no-load voltage computing circuit 5b has an input terminal 30 connected to the frequency instruction generating unit 9, an input terminal 36 connected to the excitation current instruction setting unit 4, an input terminal 31 connected to the primary self-inductance setting device 12, an input terminal 32 connected to the primary self-inductance correcting circuit 13a, an adder 33, multipliers 34, 35, and an output terminal 37.

Figure 3:
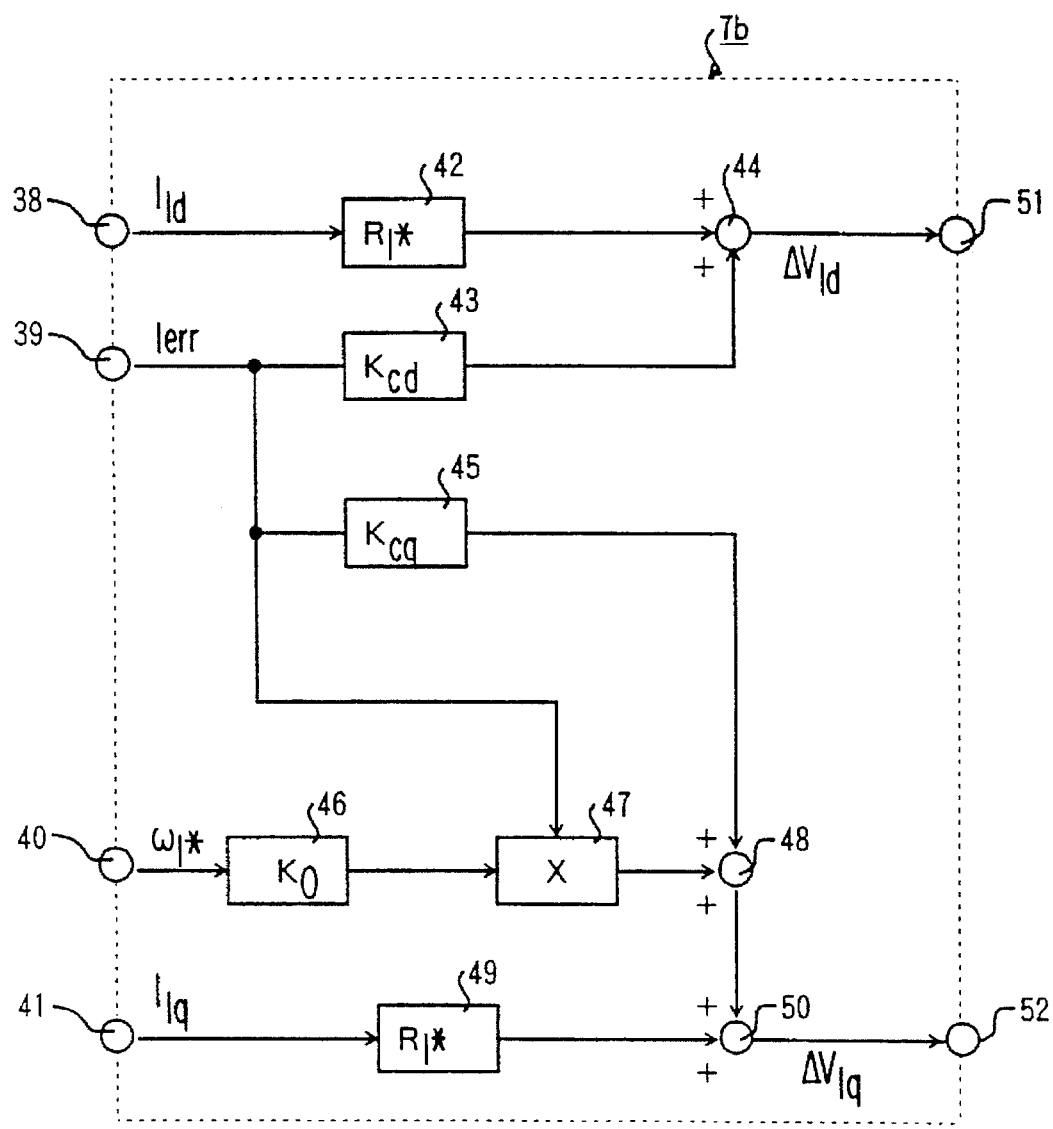
FIG. 3 is a block diagram showing the configuration of a correction voltage computing circuit according to Embodiment 1.

FIG. 3 is a block diagram showing the detailed configuration of the correction voltage computing circuit 7b described above. In this figure the correction voltage computing circuit 7b has input terminals 38, 39 each connected to the primary current element computing circuit 14, an input terminal 39 connected to the error current computing circuit 15a, an input terminal 40 connected to the frequency instruction generator 9, factor units 42, 46, 49, amplifiers 43, 45, adders 44, 48, and 50, a multiplier 47, and output terminals 51, 52.

Figure 4:
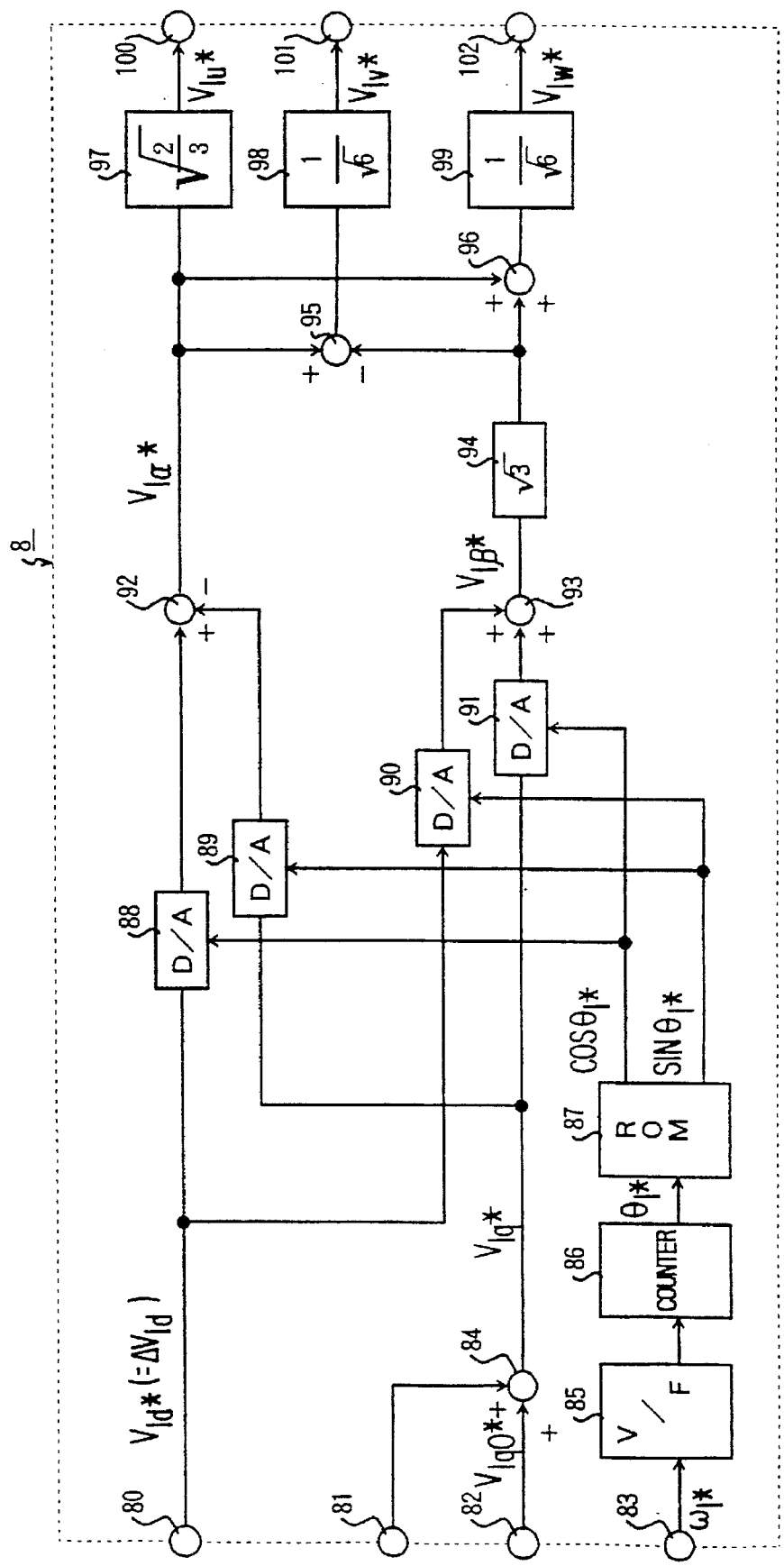
FIG. 4 is a block diagram showing the configuration of a primary voltage instruction computing circuit according to Embodiment 1.

FIG. 4 is a block diagram showing the detailed configuration of the primary voltage instruction computing circuit 8. In this figure the primary voltage instruction computing circuit 8 has input terminals 80, 81 each connected to the correction voltage computing circuit 7b, an input terminal 82 connected to the no-load voltage correcting circuit 5b, an input terminal 83 connected to the frequency instruction generator 9, adders 84, 93, 96, a V/F converter 85, a counter 86, a ROM 87, multiplication type of D/A converters 88 to 91, subtracter 92, 95, factor units 94, 97 to 99, and output terminals 100 to 102.

Figure 5:
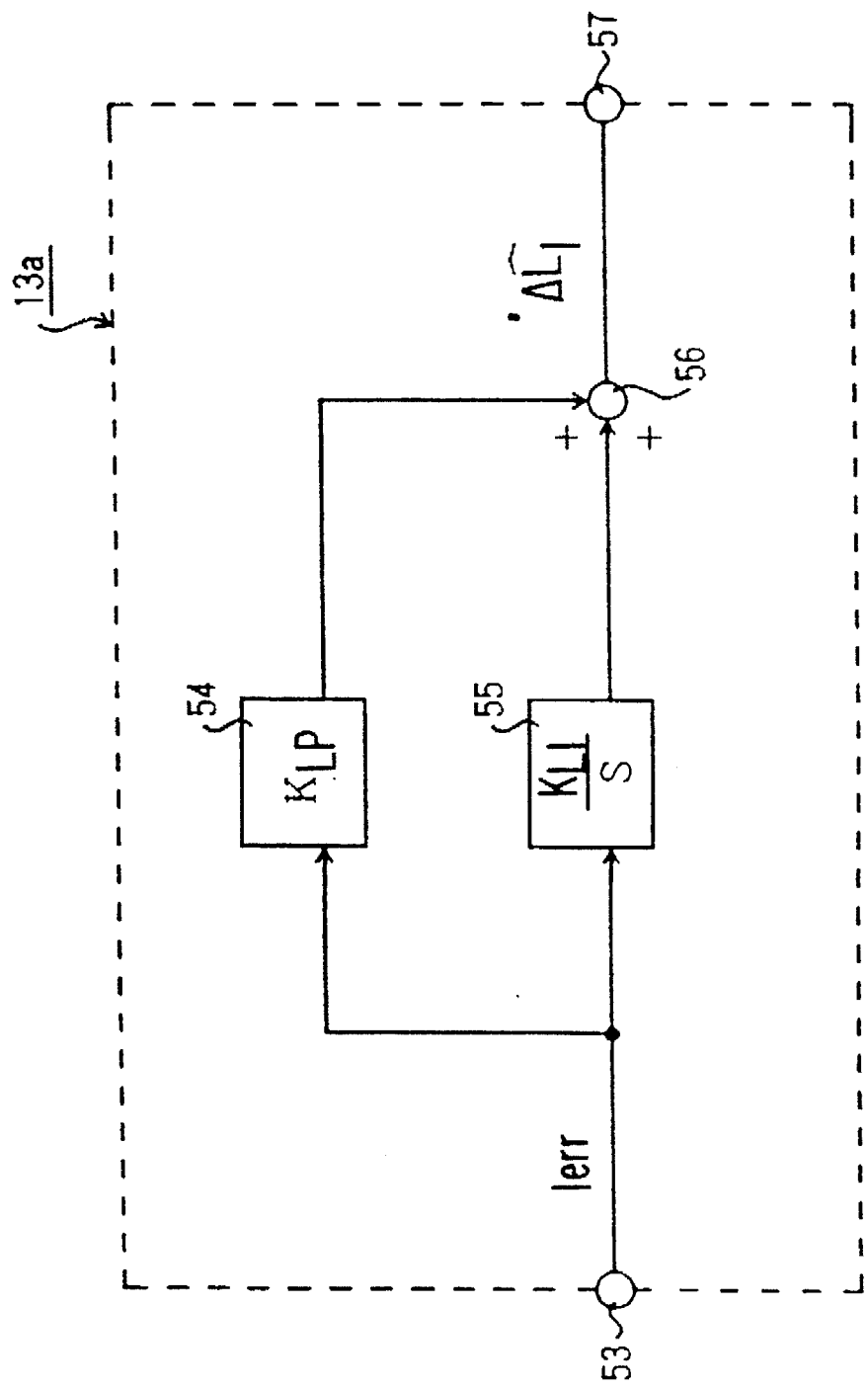
FIG. 5 is a block diagram showing the configuration of a primary self-inductance correcting circuit according to Embodiment 1.

FIG. 5 is a block diagram showing the detailed configuration of the primary self-inductance correcting circuit 13a. In this figure, the primary self-inductance correcting circuit 13a has an input terminal 53 connected to the error current computing circuit 15a, an amplifier 54, an amplification-type of integrator 55, and adder 56, and an output terminal 57.

Figure 6:
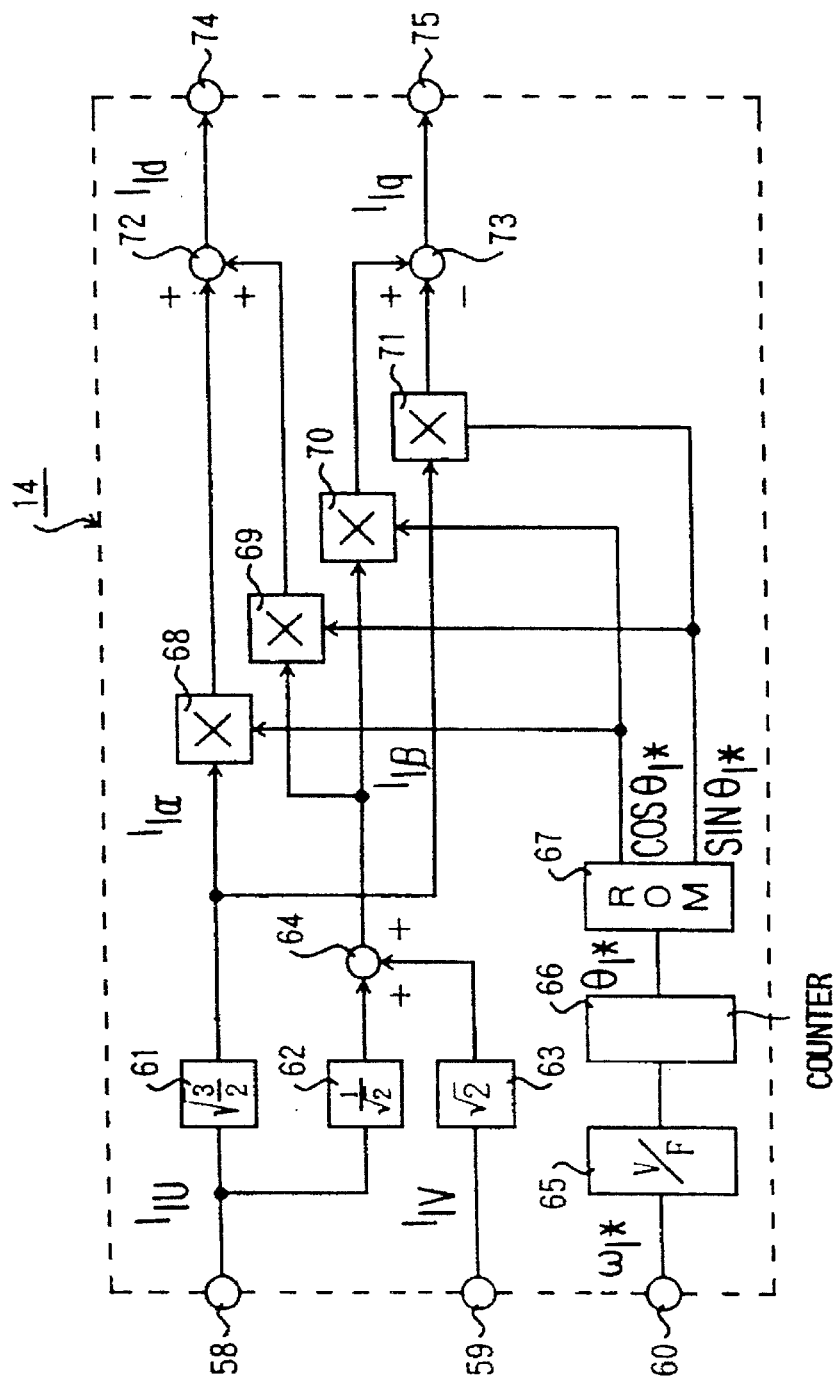
FIG. 6 is a block diagram showing the configuration of a primary current element computing circuit according to Embodiment 1.

FIG. 6 is a block diagram showing the detailed configuration of the primary current element computing circuit 14 described above. In this figure the primary current element computing circuit 14 comprises input terminals 58, 59 each connected to the current detector 2, an input terminal 60 connected to the frequency instruction generator 9, factor units 61, 62 and 63, adders 64, 72, a V/F converter 65, a counter 66, a ROM 67, multiplication type of D/A converters 68 to 71, a subtracter 73, and output terminals 74, 75.

Figure 7:
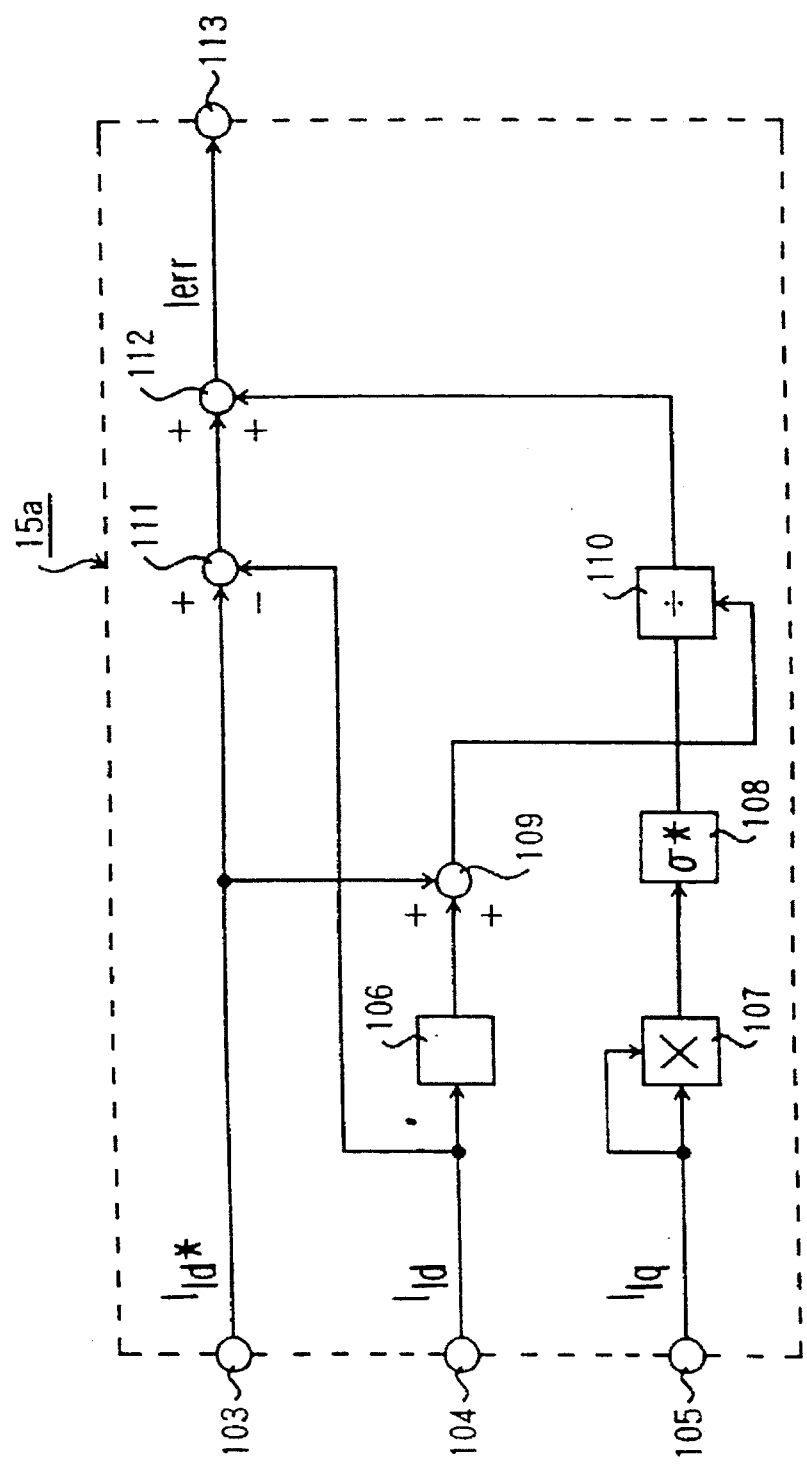
FIG. 7 is a block diagram showing the configuration of an error current computing circuit according to Embodiment 1.

FIG. 7 is a block diagram showing the detailed configuration of the error current computing circuit 15a described above. In this figure the error current computing circuit 15a has an input terminal 103 connected to the excitation current instruction setting unit 4, input terminals 104, 105 connected to the primary current element computing circuit 14, factor units 106, 108, a multiplier 107, a divider 110, subtracters 109, 111, an adder 112, and an output terminal 113.

Next, prior to a description of the operations of Embodiment 1 above, a description is provided of a method for controlling the induction motor according to Embodiment 1 of the present invention. The equations for obtaining the voltage and current for an induction motor in a rotational coordinate system (d-q coordinate system) rotating at the primary frequency $\omega_1$ is expressed by equations (13), as well known:

$$V_{1d} = (R_1 + PL_1)I_{1d} - L_1\omega_1 I_{1q} + PMI_{2d} - M\omega_1 I_{2q}$$

$$V_{1q} = L_1\omega_1 I_{1d} + (R_1 + PL_1)I_{1q} + M\omega_1 I_{2d} + PMI_{2q}$$

$$0 = PMI_{1d} - M\omega_s I_{1q} + (R_2 + PL_2)I_{2d} - L_2\omega_s I_{2q}$$

$$0 = M\omega_s I_{1d} + PMI_{1q} + L_2\omega_s I_{2d} + (R_2 + PL_2)I_{2q} \qquad (13)$$

Here, $L_1$, $L_2$ are primary and secondary self-inductances of an induction motor, M is the primary/secondary mutual inductance, $I_{2d}$, $I_{2q}$ are d-axis and q-axis elements of the secondary current, respectively, $\omega_s$ is the slip frequency of the induction motor, and P is a differential operator (=d/dt).

Next, the d-axis and q-axis elements $\Phi_{1d}$, $\Phi_{1q}$ are expressed, as well known, by equations (14) below:

$$\Phi_{1d}=L_1I_{1d}+MI_{2d}$$
$$\Phi_{1q}=L_1I_{1q}+MI_{2q} \quad (14)$$

When $I_{2d}$ and $I_{2q}$ are eliminated by substituting equation (14) into equation (13), equations (15) and (16) are obtained:

$$V_{1d}=R_1I_{1d}+P\Phi_{1d}-\omega_1\Phi_{1q}$$
$$V_{1q}=R_1I_{1q}+P\Phi_{1q}-\omega_1\Phi_{1d} \quad (15)$$
$$0=(R_2+PL_2)\Phi_{1d}-L_1(R_2+PL_2\sigma)I_{1d}-L_2\omega_s\Phi_{1q}+\sigma L_1L_2\omega_sI_{1q}$$
$$0=(R_2+PL_2)\Phi_{1q}-L_1(R_2+PL_2\sigma)I_{1q}+L_2\omega_s\Phi_{1d}+\sigma L_1L_2\omega_sI_{1d} \quad (16)$$

Here, the leak factor $\sigma$ is given by equation (17):

$$\sigma=1-M^2/(L_1L_2) \quad (17)$$

It is assumed that the primary magnetic flux $\Phi_1$ is controlled at a constant level as set previously, and equation (18) is applied:

$$\Phi_{1d}=L_1L_{1d}*$$
$$\Phi_{1q}=0 \quad (18)$$

Here, $I_{1d}*$ is an excitation current instruction value. Furthermore it is assumed by taking into consideration the constant state that the differential operator P is 0. Then equation (19) can be obtained by substituting equation (18) into equation (15). Also, equation (20) can be obtained by substituting equation (18) into equation (16):

$$V_{1d}=R_1I_{1d}$$
$$V_{1q}=R_1I_{1q}+L_1\omega_1I_{1d}* \quad (19)$$
$$0=I_{1d}*-I_{1d}+\sigma I_{1q}^2/(I_{1d}*-\sigma I_{1d}) \quad (20)$$

For this reason, when $V_{1d}$ and $V_{1q}$ are given using equation (19), equation (18) is satisfied in the constant state, and the primary magnetic flux $\Phi_1$ is controlled at a constant level as set previously.

In this step, to improve the damping characteristics of the control system and insure improved stability, by making use of the fact that if equation (18) is satisfied, $I_{1d}$ and the instruction value $I_{1d}*$ establish equation (20), a term is added so that the right side of equation (20) becomes zero. With this operation, equation (21) is obtained:

$$V_{1d}=R_1*I_{1d}+K_{cd}I_{err}$$
$$V_{1q}=R_1*I_{1q}+L_1*\omega_1I_{1d}*+(K_0\omega_1+K_{cq})I_{err} \quad (21)$$

In equation (21), $K_0$ and $I_{err}$ are obtained using equations (22) and (23), respectively:

$$K_0=\sigma*L_1*/(1-\sigma*), \quad (22)$$

where $$K_{cd}=K_0K_d, \quad K_{cq}=K_0K_q.$$

$$I_{err}=I_{1d}*-I_{1d}+\sigma*I_{1q}^2/(I_{1d}*-\sigma*I_{1d}) \quad (23)$$

In equation (21) is included a set value $L_1*$ for the primary self-inductance $L_1$. In a general induction motor, the actual value of the primary self-inductance does not coincide with the design value because of manufacturing variations, which generates dispersion. Also, when such control operations as variable excitation or weak excitation are executed, the influence of magnetic saturation occurs, and the primary self-inductance $L_1$ changes significantly due to the size of the excitation current. It is very complicated to measure and make this change and to store a curve representing the change. In the present invention, if there is an error between the set value $L_1*$ for the primary self-inductance and the true valve $L_1$, the value of $I_{err}$ is proportionated and integrated according to a preset gain making use of the fact that the current error $I_{err}$ in equation (23) will not become zero, and the resulting value is used as a correction value $\hat{L}_1$ for the set value $L_1*$ of the primary self-inductance.

Namely, the correction value $\Delta\hat{L}_1$ for the set value $L_1*$ of the primary self-inductance is computed using equation (24), and then $L_1*$ is added, as indicated by equation (25), to obtain the primary inductance estimated value $\hat{L}_1$. Then, $L_1*$ in equation (21) is substituted with $\hat{L}_1$ obtained using equation (25) to obtain equation (26):

$$\hat{L}_1=(K_{LP}+K_{LI}/S)I_{err} \quad (24)$$

$K_{LP}$ is a proportional gain, while $L_{LI}$ is an integration gain.

$$\hat{L}_1=L_1*+\Delta\hat{L}_1 \quad (25)$$
$$V_{1d}=R_1*I_{1d}+K_{cd}I_{err}$$
$$V_{1q}=R_1*I_{1q}+\hat{L}_1\omega_1I_{1d}*+(K_0\omega_1+K_{cq})I_{err} \quad (26)$$

In the control system for the induction motor according to Embodiment 1 of the present invention as described above, even if there is an error in the set value for the primary self-inductance, or even if the actual value of the primary self-inductance changes due to influences of magnetic saturation, correction is automatically executed in such a manner that the primary magnetic flux $\Phi_1$ is always kept at a constant value according to the set value and excellent control for the induction motor is realized.

Figure 8:
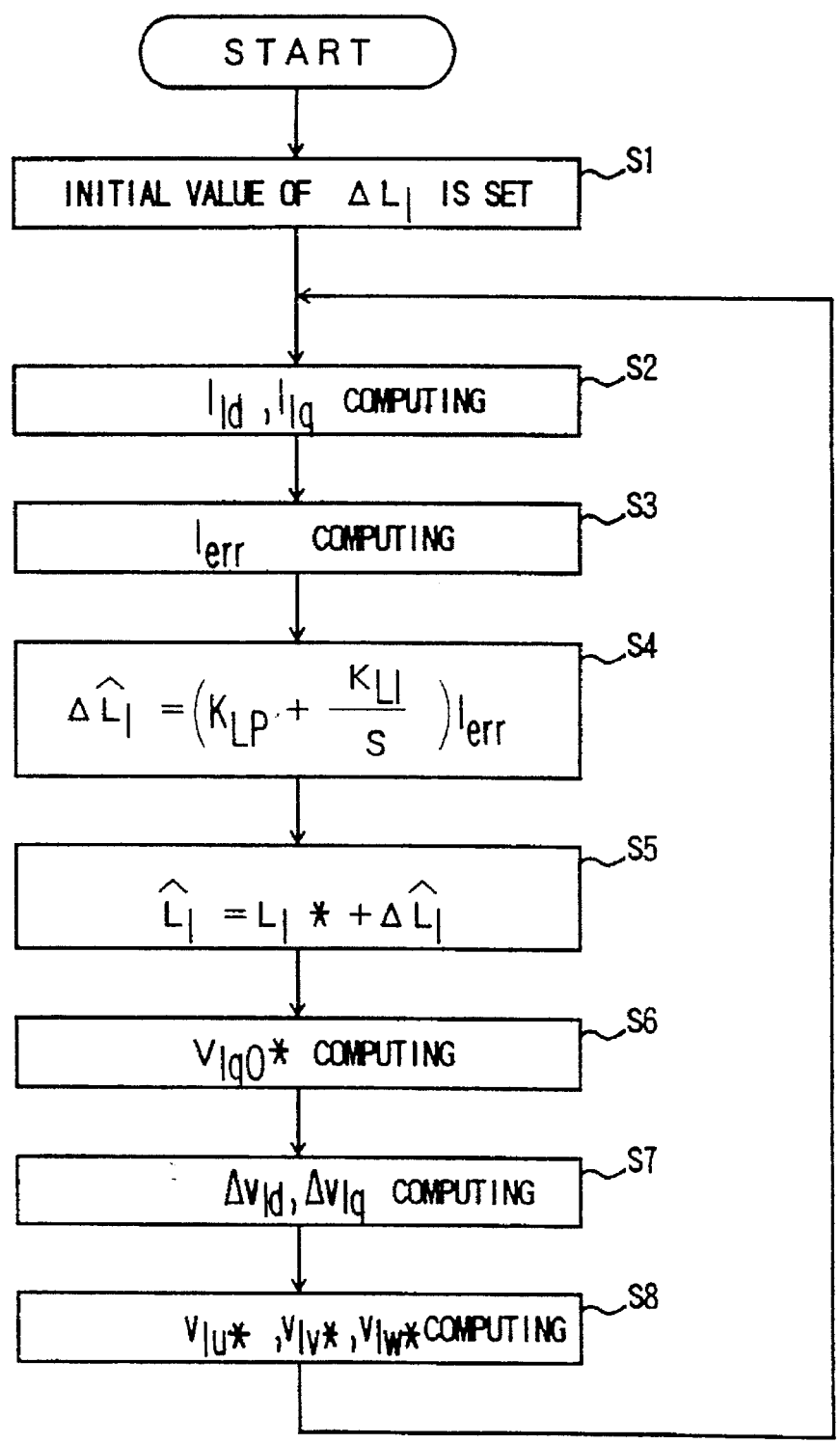
FIG. 8 is a flow chart showing the operation of a control unit for an induction motor according to Embodiment 1 of the present invention.

Next, a description is made for operations in Embodiment 1 according to flow chart shown in FIG. 8 with reference to FIG. 2 to FIG. 7. At first, an initial value of $\Delta L_1$ is set (Step S1). Next, as shown in FIG. 6, d-axis element $I_{1d}$ and q-axis element $I_{1q}$ of the primary current are outputted from the error current computing circuit 14 (Step S2). Namely, the primary currents $I_{1u}$ and $I_{1v}$ in the induction motor 1 detected by the current detector 2 are inputted to the input terminals 58 and 59 respectively, when computing according to equation (27) is executed by the factor units 61 to 63 and the adder 64, and the α-axis and β-axis elements $I_1\alpha$ and $I_1\beta$ on the orthogonal coordinate system (α-β coordinate system) are outputted from the factor unit 61 and the adder 64 respectively.

$$I_1\alpha=\sqrt{\frac{3}{2}}\,I_{1u}$$
$$I_1\beta=\frac{1}{\sqrt{2}}I_{1u}+\sqrt{2}\,I_{1v} \quad (27)$$

On the other hand, when the primary frequency instruction $\omega_1*$, which is an analog value outputted from the frequency instruction generator 9, is inputted via the input terminal 60 into the V/F converter 65, a pulse series signal with the frequency proportional to the primary instruction $\omega_1^*$ is obtained, an angular instruction $\theta_1^*$ which is a digital value and a time integration value for the primary frequency instruction $\omega_1^*$ is obtained by the counter 66, and is inputted as an address of ROM 67 with the values for sin $\theta_1^*$ and cos $\theta_1^*$ stored therein. Then, digital values for sin $\theta_1^*$ and cos $\theta_1^*$ are outputted from the ROM 67. Next, $I_1\alpha$ and $I_1\beta$, each outputted from the factor unit 61 and the adder 64, as well as digital values for sin $\theta_1^*$ and cos $\theta_1^*$ are inputted to the multiplication type of D/A converters 68 to 71 and subjected to analog conversion, and then the values are inputted to the adder 72 and subtracter 73, when computing using equation (28) is executed, d-axis and q-axis elements $I_{1d}$ and $I_{1q}$ of the primary current obtained as output from the adder 72 and the subtracter 73 are outputted from the output terminals 74, 75.

$$I_{1d} = I_1\alpha \cos\theta_1^* + I_1\beta \sin\theta_1^*$$

$$I_{1q} = -I_1\alpha \sin\theta_1^* + I_1\beta \cos\theta_1^* \qquad (28)$$

Then, as shown in FIG. 7, the error current $I_{err}$ is outputted from the error current computing circuit 15a (Step S3). Namely, the excitation current instruction $I_{1d}^*$ outputted via the input terminal 103 from the excitation current instruction setting unit 4, d-axis and q-axis elements $I_{1d}$ and $I_{1q}$ of the primary current outputted via the input terminals 104, 105 from the primary current element computing circuit 14, and the error current Ierr computed using equation (23) by the factor units 106 and 108, multiplier 107, divider 110, adder 112, and subtracters 109, 111 are outputted from the output terminal 113.

Then, as shown in FIG. 3, correction voltage elements $\Delta V_1$ and $\Delta V_{1q}$ for the d axis and q axis are outputted from the correction voltage computing circuit. Namely, for the d-axis element $I_{1d}$ and the q-axis element $I_{1q}$ each primary current is outputted via the input terminals 38, 41 from the primary current element computing circuit 14, and also the error current element $I_{err}$ is outputted via the input terminal 39 from the error current computing circuit 15a. As a result, computing of the right side of equation (26) for $V_{1d}$ is executed by the factor unit 42, amplifier 43, and adder 44, and the resultant value is outputted as the correction voltage element $\Delta V_{1d}$ for the d axis from the output terminal 51. On the other hand, computing of the third term in the right side of equation (26) for $V_{1q}$ is executed by the amplifier 45, factor unit 46, multiplier 47, and adder 48 from the error current element $I_{err}$ and the primary frequency instruction $\omega_1$ outputted via the input terminal 40 from the frequency instruction generator 9, and also computing of the first term in the right side of equation (26) for $V_{1q}$ is executed by the factor unit 49. Then, outputs from the adder 48 and factor unit 49 are added by the adder 50, when the voltage for the second term in the right side of equation (26) for $V_{1q}$, namely, the voltage elements excluding a no-load voltage, are outputted as the correction voltage element $\Delta V_{1q}$ for the q axis from the output terminal 52.

Then, as shown in FIG. 5, the correction value $\Delta \hat{L}_1$ for the set value $L_1^*$ of the primary self-inductance is outputted from the primary resistance correcting circuit 9 (Step S4). Namely, the error current element $I_{err}$ is outputted via the input terminal 53 from the error current element computing circuit 15a. Then, computing of equation (24) is executed by the amplifier 54, amplification-type integrator 55 and adder 56, and the resultant value is outputted as the correction value $\Delta \hat{L}_1$ for the set value $L_1^*$ of the primary self-inductance from the output terminal 57.

Then, as shown in FIG. 2, the no-load voltage instruction $V_{1q0}^*$ is outputted from the no-load voltage computing circuit 5b. Namely, the set value $L_1^*$ for the primary self-inductance outputted via the input terminal 31 from the primary self-inductance setting unit 12 and the correction value $\Delta \hat{L}_1$ for the primary self-inductance outputted via the input terminal 32 from the primary self-inductance correcting circuit 13a are added by the adder 33 to produce an estimated value $\hat{L}_1$ for the primary self-inductance (Step S5). Also, the primary frequency instruction $\omega_1^*$ outputted via the input terminal 30 from the frequency instruction generator 9 is multiplied by the estimated value $\hat{L}_1$ for the primary self-inductance outputted from the adder 33 by the multiplier 34, and then the resultant value is multiplied by the excitation current instruction $I_{1d}^*$ outputted via the input terminal 36 from the excitation current instruction setting unit 4 by the multiplier 35, when the no-load voltage instruction $V_{1q0}^*$ ($=\hat{L}_1\omega_1^*I_{1d}^*$), equivalent to the second term in the right side of equation (26) for $V_{1q}$, is obtained and outputted upon the output terminal 37 (Step S6).

Then, as shown in FIG. 4, the primary voltage instructions $V_{1u}^*$, $V_{1v}^*$ and $V_{1w}^*$ are outputted by the primary voltage instruction computing circuit 8. Namely, the correction voltage elements $\Delta V_{1d}$, $\Delta V_{1q}$ for the d axis and q axis are outputted via the input terminals 80 and 81 from the correction voltage computing circuit 7b (Step S7). Herein, as indicated by equation (26), the d-axis element $V_{1d}$ of the primary voltage becomes zero when there is no load, so that $\Delta V_{1d}$ can be regarded as the d-axis element instruction $V_{1d}^*$. On the other hand, the no-load voltage instruction $V_{1q}^*$ outputted via the input terminal 82 from the no-load voltage computing circuit 5 and the correction voltage element $\Delta V_{1q}^*$ for the q axis are added by the adder 84, computation of the right side of equation (26) for $V_{1q}$ is executed, and the resultant value is outputted as the q-axis element instruction $V_{1q}^*$ of the primary current. Then, the primary frequency instruction $\omega_1^*$ is inputted via the input terminal 83 from the frequency instruction generator 9 when, by way of an operation similar to that of the primary current element computing circuit 14 described above, digital values for sin $\theta_1^*$ and cos $\theta_1^*$, each outputted from the ROM 87, are inputted to the multiplication type D/A converters 88 to 91 and subjected to multiplication and analog conversion therein. The resultant values are inputted to the subtracter 92 and adder 93, where computation using equation (29) is executed. Thus, the $\alpha$-axis element instruction $V_1\alpha^*$ and the $\beta$-axis element instruction $V_1\beta^*$ for the primary voltage are obtained.

$$V_1\alpha^* = V_{1d}^* \cos\theta_1^* - V_{1q}^* \sin\theta_1^*$$

$$V_1\beta^* = V_{1d}^* \sin\theta_1^* + V_{1q}^* \cos\theta_1^* \qquad (29)$$

Then the computing using equation (30) is executed by the factor units 94, 97 to 99, subtracter 95, and adder 96, and the primary voltage instructions $V_{1u}^*$, $V_{1v}^*$ and $V_{1w}^*$ are outputted from the output terminals 100 to 102, respectively (Step S8).

$$V_{1u}^* = \sqrt{\frac{2}{3}}\, V_1\alpha^* \qquad (30)$$

$$V_{1v}^* = \frac{1}{\sqrt{6}}(V_1\alpha^* - \sqrt{3}\, V_1\beta^*)$$

$$V_{1w}^* = -\frac{1}{\sqrt{6}}(V_1\alpha^* + \sqrt{3}\, V_1\beta^*)$$

Then, the primary voltage instructions $V_{1u}^*$, $V_{1v}^*$ and $V_{1w}^*$ are inputted to the variable frequency power converting circuit 3, when, by way of an operation similar to that in the conventional unit, actual values of the primary voltage applied to the induction motor 1 are controlled so that they follow the primary voltage instructions.

It should be noted that, although the description of Embodiment 1 above assumes that the primary self-inductance correcting circuit 13a is implemented with an amplifier and an amplification type integrator, the primary self-inductance correcting circuit 13a may include only an amplification type integrator. Furthermore, in the embodiment above the primary current $I_{1w}$ are computed from $I_{1u}$ and $I_{1v}$, but a value detected by a current detector may be used.

Also, the primary self-inductance set value $L_1^*$ and a correction rate for the primary self-inductance value $\Delta \hat{L}_1$ are summed and the sum employed to obtain a primary self-inductance estimated value $\hat{L}_1$ in the no-load voltage computing circuit 5b. However, this summing operation may be executed in the primary self-inductance correcting circuit 13a. Furthermore, the primary self-inductance set value $L_1^*$ may not be outputted from the primary self-inductance setting unit 12, but may be set in the no-load voltage computing circuit 5b or primary self-inductance correcting circuit 13a as a constant.

Next, a description is given for Embodiment 2 of the present invention.

Figure 9:
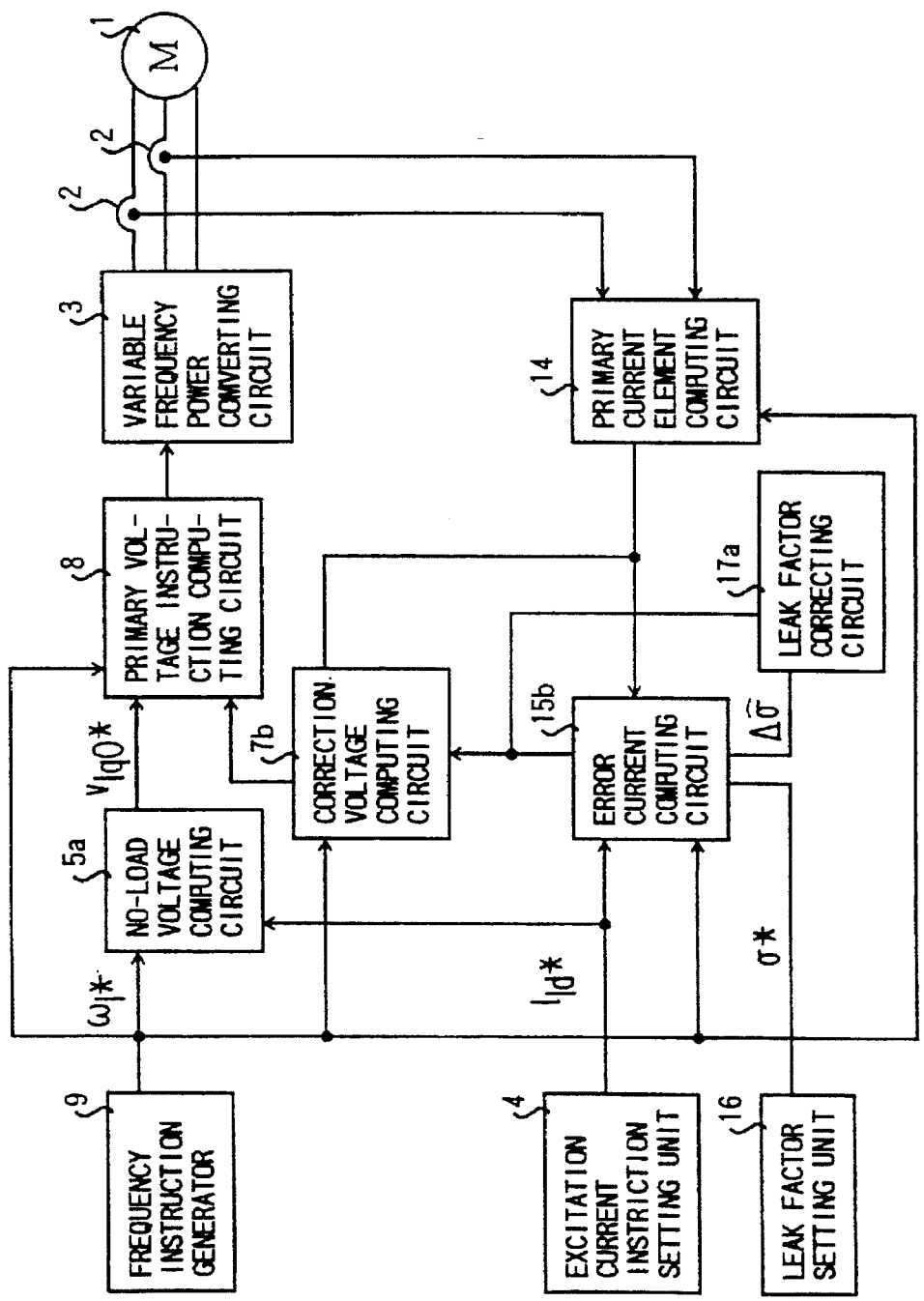
FIG. 9 is a block diagram showing the general configuration of a control unit for an induction motor according to Embodiment 2 of the present invention.

FIG. 9 is a block diagram showing general configuration in Embodiment 2. In this figure designated at reference numeral 1 is an induction motor, at 2 a current detector, at 3 variable frequency power converting circuit, at 4 an excitation current instruction setting unit, at 5a a no-load voltage computing circuit, at 7b a correction voltage computing circuit, at 8 a primary voltage instruction computing circuit, at 9 a frequency instruction generator, at 14 a primary current element computing circuit, at 15b an error current computing circuit, at 16 a leak factor setting unit, and at 17a a leak factor correcting circuit.

Figure 10:
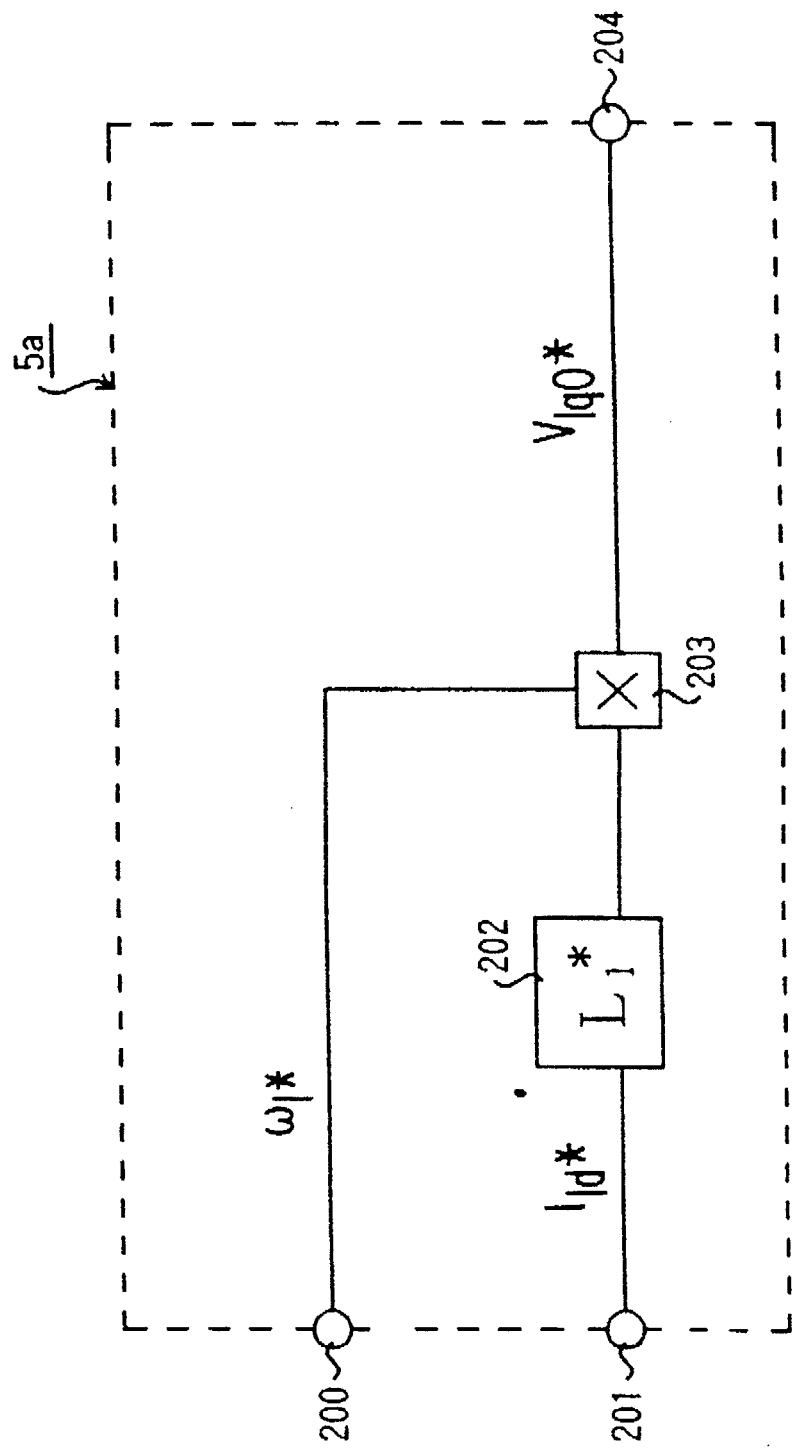
FIG. 10 is a block diagram showing the configuration of a no-load voltage computing circuit according to Embodiment 2.

FIG. 10 is a block diagram showing the detailed configuration of the no-load voltage computing circuit 5a described above. In this figure, the no-load voltage computing circuit 5b has an input terminal 200 connected to the frequency instruction generator 9, an input terminal 201 connected to the excitation current instruction setting unit 4, a factor unit 202, a multiplier 203, and an output terminal 204.

Figure 11:
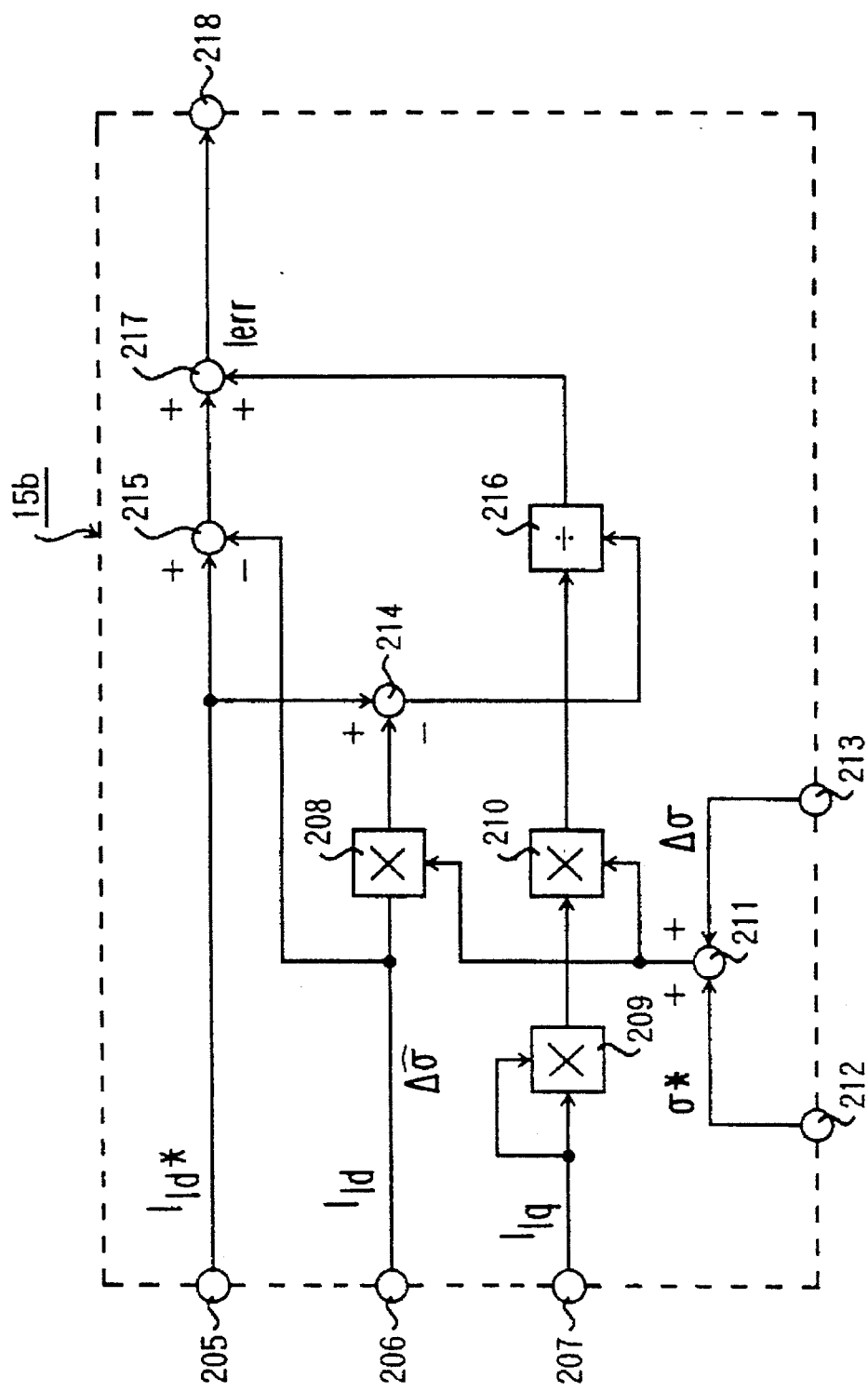
FIG. 11 is a block diagram showing the configuration of an error current computing circuit according to Embodiment 2.

FIG. 11 is a block diagram showing the detailed configuration of the error current computing circuit 15b described above. In this figure the error current computing circuit 15b has an input terminal 205 connected to the excitation current instruction setting device 4, input terminal 206, 207 connected to the primary current element computing circuit 14, an input terminal 212 connected to the leak factor setting unit 16, an input terminal 213 connected to the leak factor correcting circuit 17a, multipliers 208 to 210, a divider 216, subtracters 214, 215, adders 211, 217, and an output terminal 218.

Figure 12:
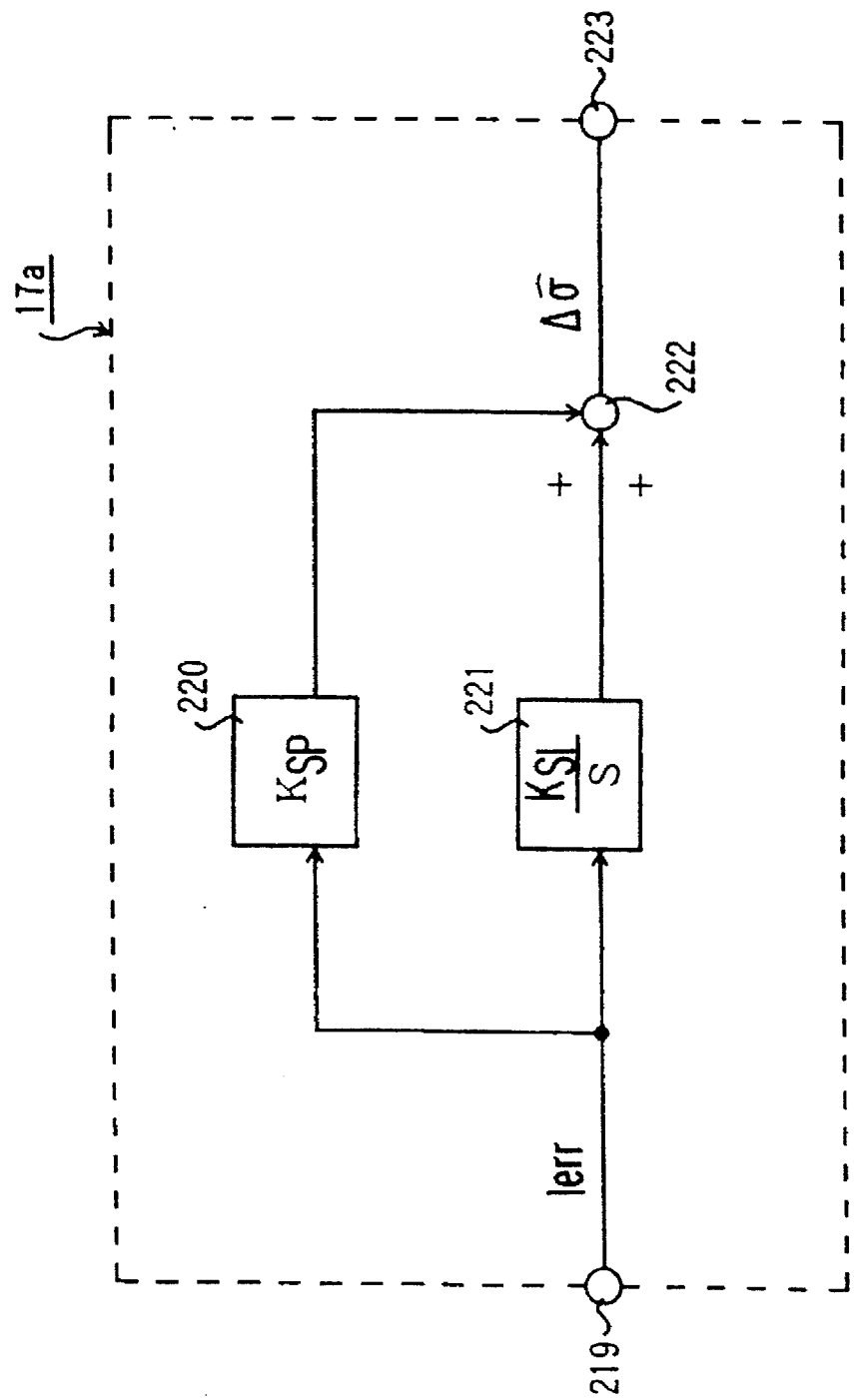
FIG. 12 is a block diagram showing the configuration of a leak factor correcting circuit according to Embodiment 2.

FIG. 12 is a block diagram showing the detailed configuration of the leak factor correcting circuit 17a described above. In this figure the leak factor correcting circuit 17a comprises an input terminal 219 connected to the error current computing circuit 15b, an amplifier 220, an amplification-type integrator 221, an adder 222, and an output terminal 223.

Next, a description is given of a control system for the induction motor according to Embodiment 2 above. As described in relation to Embodiment 1 above, when $V_{1d}$ and $V_{1q}$ are determined using equations (21) to (23), the primary magnetic flux $\Phi_1$ is kept at a constant level according to the design value.

Equation (21) includes a set value $\sigma^*$ for the leak factor $\sigma$. In general induction motors, the actual value of the leak factor $\sigma$ may not coincide with the design value due to manufacturing variations, and dispersion is generated. Also in general induction motors, magnetic saturation is generated, and the leak factor may change significantly according to the size of the primary and secondary currents. It is extremely difficult to measure these values and to store a curve representative thereof. In the present invention, if there is an error between the set value $\sigma^*$ for the leak factor and the true value $\sigma$, by making use of the fact that the error current $I_{err}$ given by equation (23) does not become zero, $I_{err}$ is subjected to proportionating and integration with a preset gain, and the resultant value is used as a correction value $\Delta \hat{\sigma}$ for the leak factor set value $\sigma^*$.

Namely, the correction value $\Delta \hat{\sigma}$ for the set value $\sigma^*$ for the leak factor is computed using equation (31), and $\sigma^*$ is added to the resultant value as shown in equation (32) to obtain the leak factor estimated value $\hat{\sigma}$. Then $\sigma^*$ in equation (23) is substituted for $\hat{\sigma}$ obtained using equation (32), thus equation (33) being established:

$$\Delta\hat{\sigma}=(K_{SP}+K_{SI}/S)I_{err} \tag{31}$$

Here, $K_{SP}$ is a proportional gain, while $K_{SI}$ is an integral gain.

$$\hat{\sigma}=\sigma^*+\Delta\hat{\sigma} \tag{32}$$

$$I_{err}=I_{1d}^*-I_{1d}+\hat{\sigma}I_{1q}^2/(I_{1d}^*-\hat{\sigma}I_{1d}) \tag{33}$$

The control system according to Embodiment 2 of the present invention is as described above, and even if there is an error in a set value for the leak factor, or even if an actual value of the leak factor changes due to influence by magnetic saturation, the correction is automatically executed, so that the primary magnetic flux $\Phi_1$ is always kept at a constant level according to the set value and excellent control for the induction motor can be provided.

Figure 13:
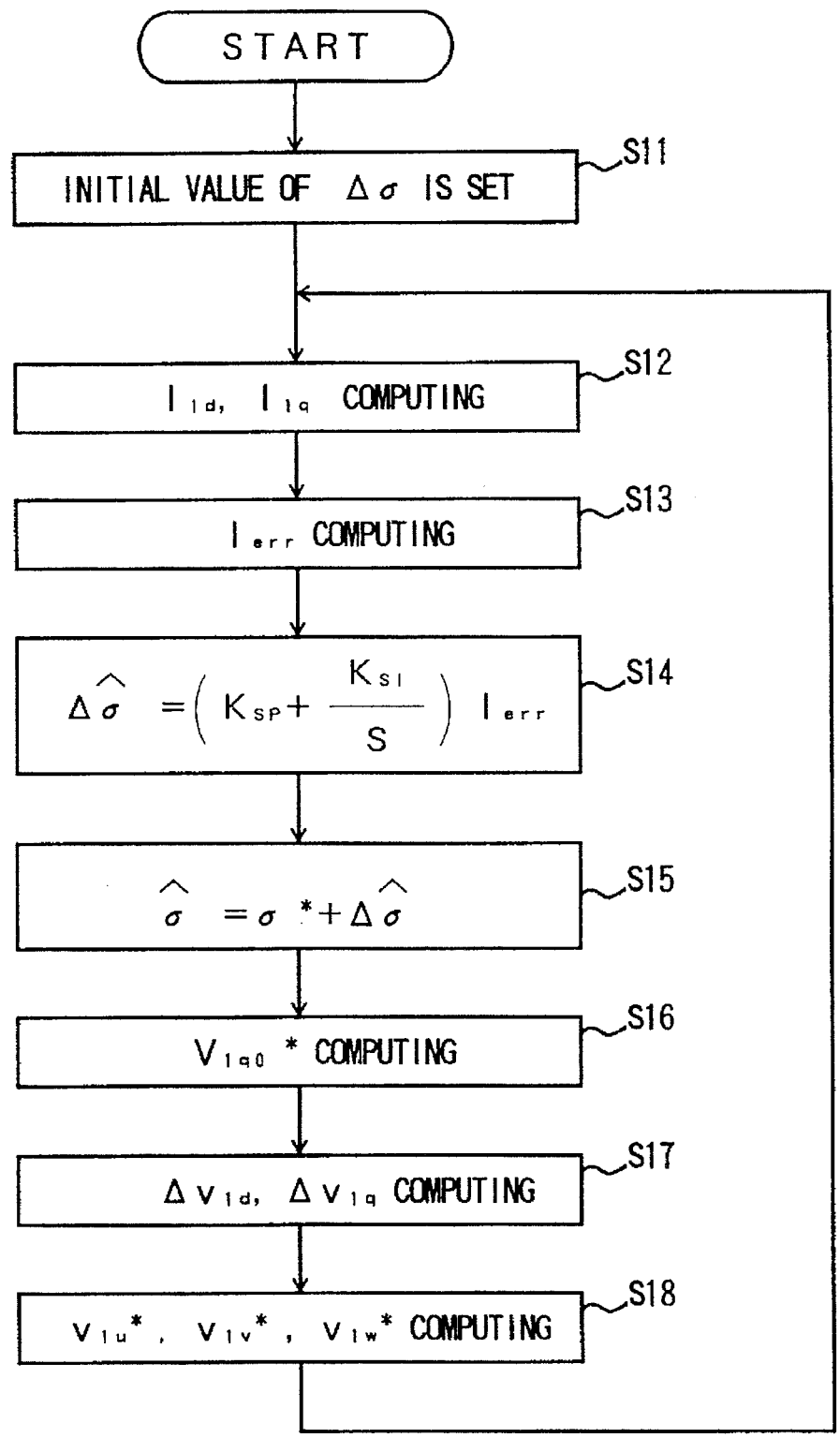
FIG. 13 is a flow chart showing the operation of a control unit for an induction motor according to Embodiment 2 of the present invention.

Then description is made for operations in Embodiment 2 according to the flow chart shown in FIG. 13 described above with reference to FIG. 10 to FIG. 12. At first, an initial value of $\Delta\hat{\sigma}$ is set (Step S11). Next, as shown in FIG. 10, the no-load voltage instruction $V_{1q0}^*$ is outputted from the no-load voltage computing circuit 5a. Namely, the excitation current instruction $I_{1d}^*$ is inputted from the excitation current instruction setting unit 4 via the input terminal 201 into the factor unit 202, and then the resultant value is multiplied by the primary frequency instruction $\omega_1^*$ outputted via the input terminal 200 from the frequency instruction generator 9 by the multiplier 203, when the no-load voltage instruction $V_{1q0}^*$ (=$L_1^*\omega_1^*I_{1d}^*$) equivalent to the second term in the right side of equation (26) for $V_{1q}$ is obtained and outputted from the output terminal 204.

Also as shown in FIG. 12, the correction value $\Delta\hat{\sigma}$ for the leak factor set value $\sigma^*$ is outputted from the leak factor correcting circuit 17a (Step S14). Namely, the error current element $I_{err}$ is outputted via the input terminal 219 from the error current element computing circuit 15b. As a result, computation according to equation (31) is executed by the amplifier 220, amplification-type integrator 221, and adder 222, and the resultant value is outputted as the correction value $\Delta\hat{\sigma}$ for the leak factor set value $\sigma^*$ from the output terminal 223.

Then, as shown in FIG. 11, the error current $I_{err}$ is outputted from the error current computing circuit 15b. Namely, the set value $\sigma^*$ outputted via the input terminal 212 from the leak factor setting unit 16 and the correction value $\Delta\hat{\sigma}$ for the leak factor outputted via the input terminal 213 from the leak factor correcting circuit 17a are added by the adder 211, thus the leak factor estimated value $\hat{\sigma}$ being obtained (Step S15). Furthermore, the excitation current instruction $I_{1d}^*$ outputted via the input terminal 205 from the excitation current instruction setting unit 4, the d-axis and q-axis elements $I_{1d}$ and $I_{1q}$ of the primary current outputted via the input terminals 206, 207 from the primary current element computing circuit 14, and the error current $I_{err}$ computed by the multipliers 208 to 210, a divider 216, adder 217, and subtracters 214, 215 using equation (33) and obtained as an output from the adder 217 is outputted from the output terminal 218.

In other portions, the same reference numerals are applied to the same elements as those in Embodiment 1, such elements having the same operation as in Embodiment 1, so that a further description thereof is omitted herein. It should be noted that, although the description of the embodiment above assumes that the leak factor correcting circuit 17a is implemented with an amplifier and an amplification-type integrator, the leak factor correcting circuit 17a may include only an amplification type integrator. Furthermore, although the primary current $I_{1w}$ is computed from $I_{1u}$ and $I_{1v}$ in the above embodiment, also a value detected by a current detector may be used. Steps S12, S13 and S16–S18 are the same operations as the corresponding operations shown in FIG. 8, so that a further description thereof is omitted herein.

Also, the leak factor set value $\sigma^*$ and the correction value for the leak factor are summed in the error current computing circuit 15b to obtain an estimated value $\hat{\sigma}$ for summing may be executed in the leak factor correcting circuit 17a. Furthermore, the leak factor set value $\sigma^*$ may not be outputted from the leak factor setting unit 16 but may be set in the error current computing circuit 15b or the leak factor correcting circuit 17a as a constant factor.

Figure 14:
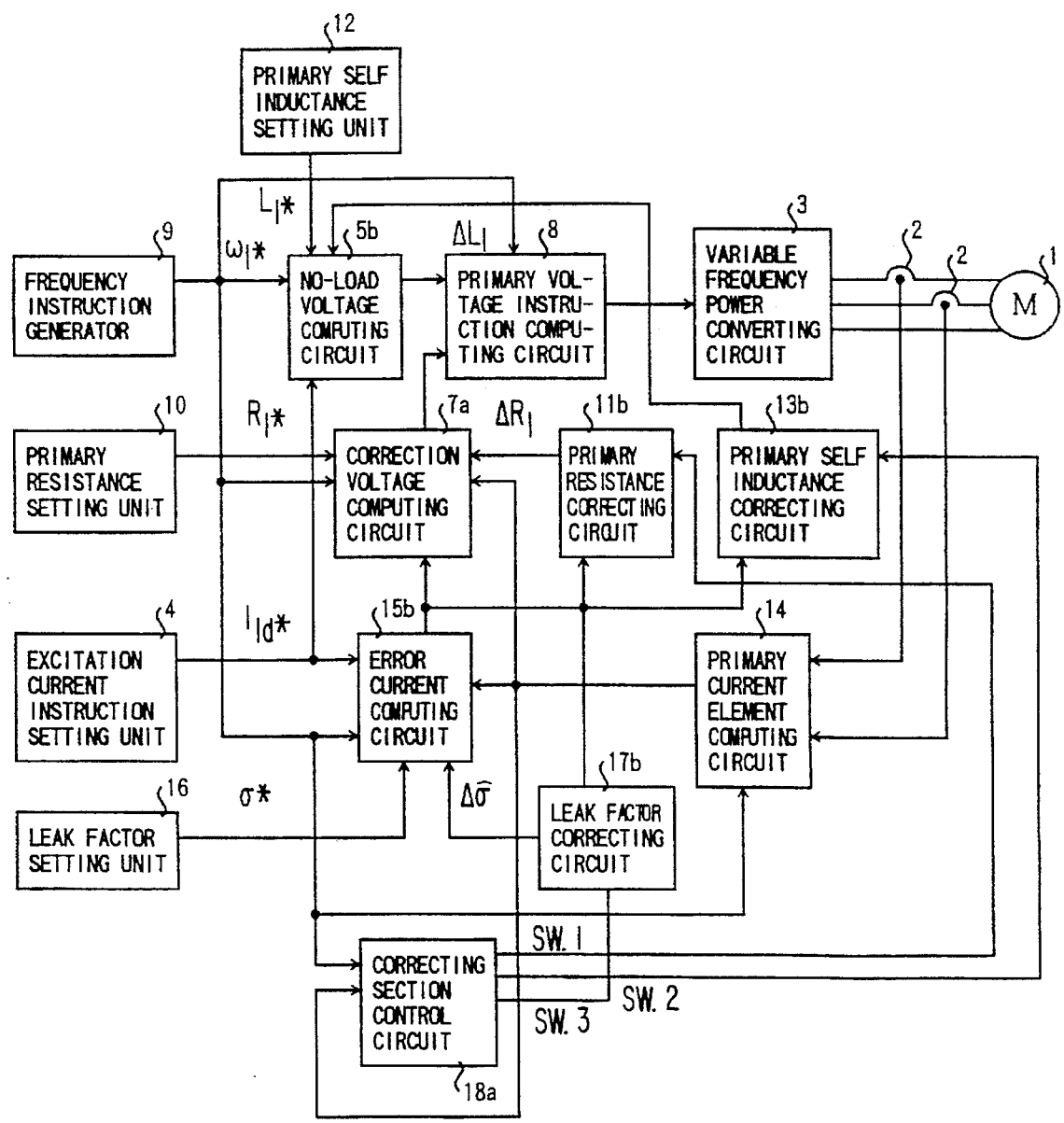
FIG. 14 is a block diagram showing the general configuration of a control unit for an induction motor according to Embodiment 3 of the present invention.

Next, a description is given of Embodiment 3 of the present invention. FIG. 14 is a block diagram showing the general configuration of Embodiment 3. In this figure, designated at reference numeral 1 is an induction motor, at 2 a current detector, at 3 a variable frequency power converting circuit, at 4 an excitation current instruction setting unit, at 5b a no-load voltage computing circuit, at 7a a correction voltage computing circuit, at 8 a primary voltage instruction computing circuit, at 9 a frequency instruction generator, at 10 a primary resistance setting unit, at 11b a primary resistance correcting circuit, at 12 a primary self-inductance setting unit, at 13b a primary self-inductance correcting circuit, at 14 a primary current element computing circuit, at 15b an error current computing circuit, at 16 a leak factor setting unit, at 17b a leak factor correcting circuit, and 18a a correcting section control circuit.

Figure 15:
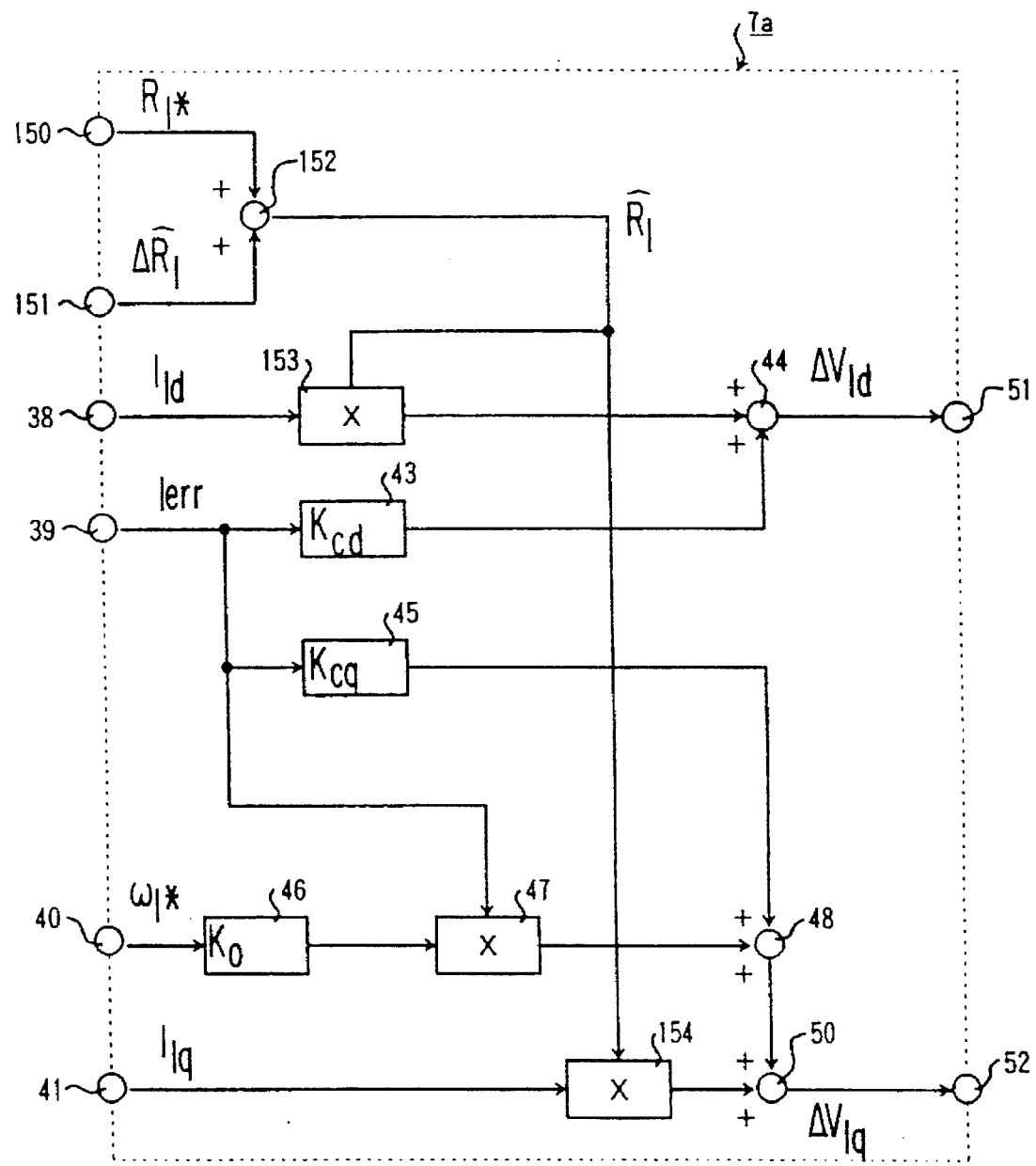
FIG. 15 is a block diagram showing the configuration of a correction voltage computing circuit according to Embodiment 3.

FIG. 15 is a block diagram showing the detailed configuration of the correction voltage computing circuit 7a described above. In this figure the correction voltage computing circuit 7a is implemented with an input terminal 150 connected to the primary resistance setting unit 10, an input terminal 151 connected to the primary resistance correcting circuit 11b, input terminals 38, 39 each connected to the primary current element computing circuit 14, an input terminal 39 connected to the error current computing circuit 15b, an input terminal 40 connected to the frequency instruction generator 9, a factor unit 46, amplifiers 43, 45, adders 44, 48, 50 and 152, multipliers 47, 153, 154, and output terminals 51 and 52.

Figure 16:
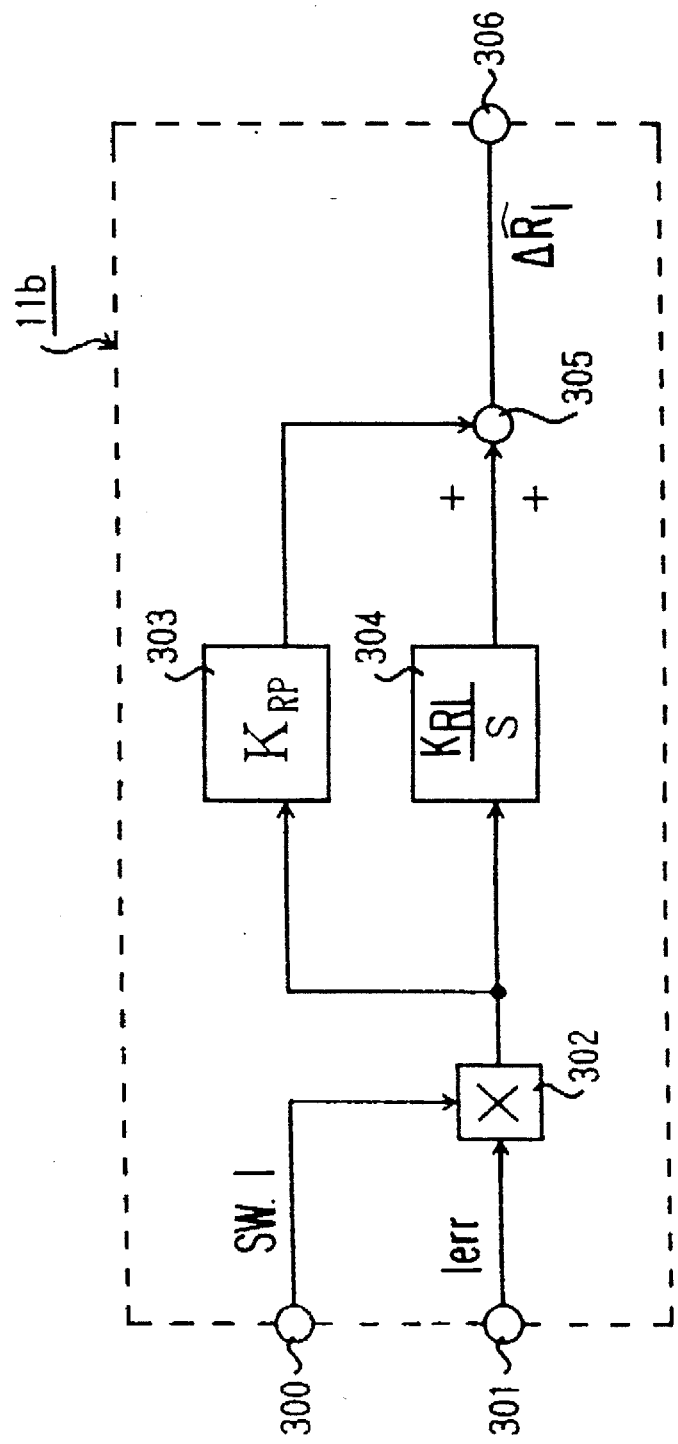
FIG. 16 is a block diagram showing the configuration of a primary resistance correcting circuit according to Embodiment 3.

FIG. 16 is a block diagram showing the detailed configuration of the primary resistance correcting circuit 11b. In this figure the primary resistance correcting circuit 11b comprises an input terminal 301, an input terminal 300 connected to the correcting section control circuit 18a, a multiplier 302, an amplifier 303, an amplification-type integrator 304, an adder 305, and an output terminal 306.

Figure 17:
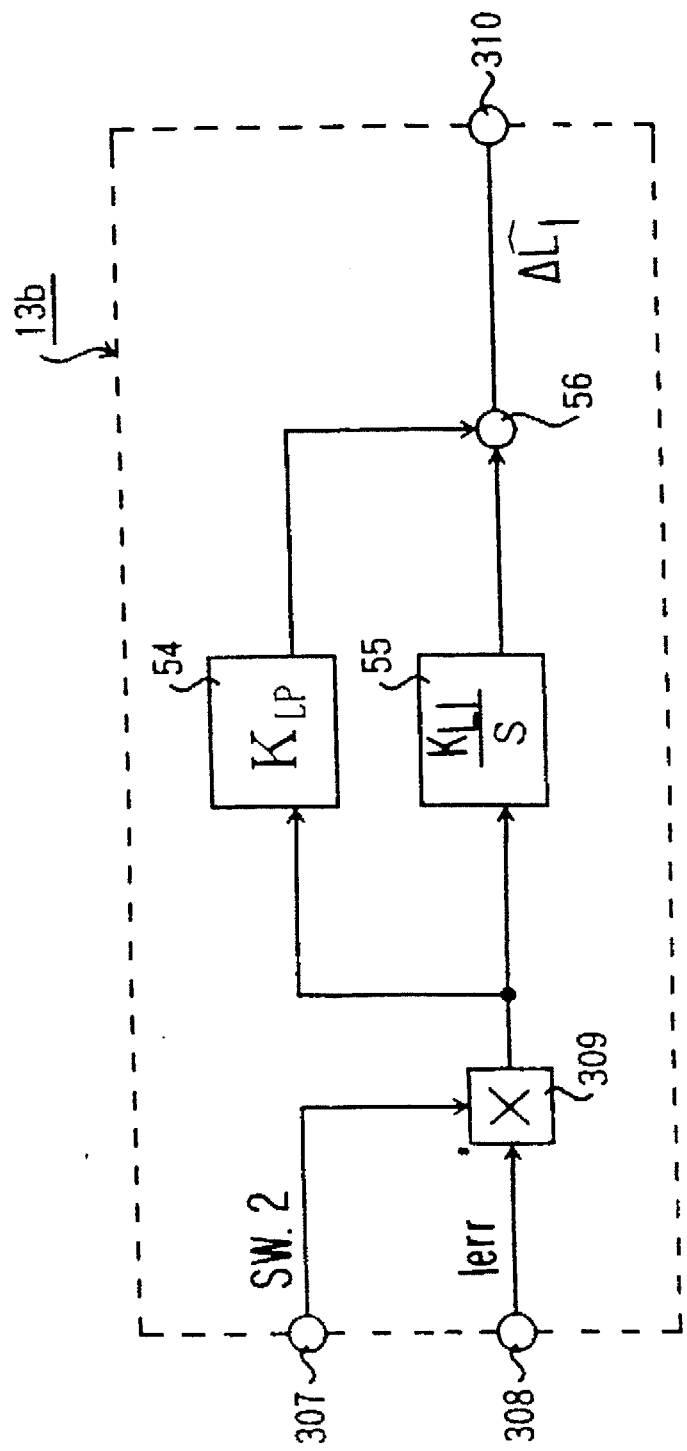
FIG. 17 is a block diagram showing the configuration of a primary self-inductance correcting circuit according to Embodiment 3.

FIG. 17 is a block diagram showing the detailed configuration of the primary self-inductance correcting circuit 13b. In this figure the primary self-inductance correcting circuit 13b comprises an input terminal 308 connected to the error current computing circuit 15b, an input terminal 307 connected to the correcting section control circuit 18a, a multiplier 309, an amplifier 54, an amplification-type integrator 55, an adder 56, and an output terminal 310.

Figure 18:
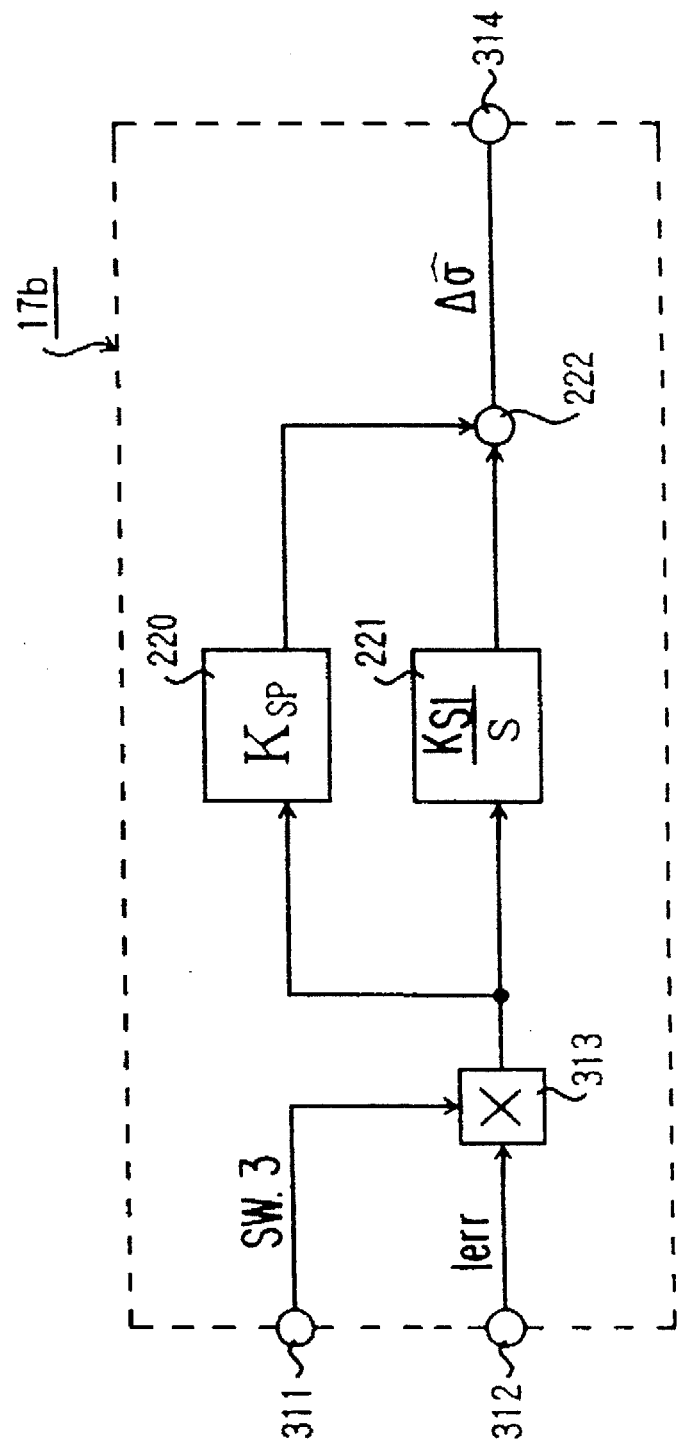
FIG. 18 is a block diagram showing the configuration of a leak factor correcting circuit according to Embodiment 3.

FIG. 18 is a block diagram showing the detailed configuration of the leak factor correcting circuit 17b described above. In this figure the leak factor correcting circuit 17b is implemented with an input terminal 312 connected to the error current computing circuit 15b, an input terminal 311 connected to the correcting section control circuit 18a, a multiplier 313, an amplifier 220, an amplification-type integrator 221, an adder 222, and an output terminal 314.

Figure 19:
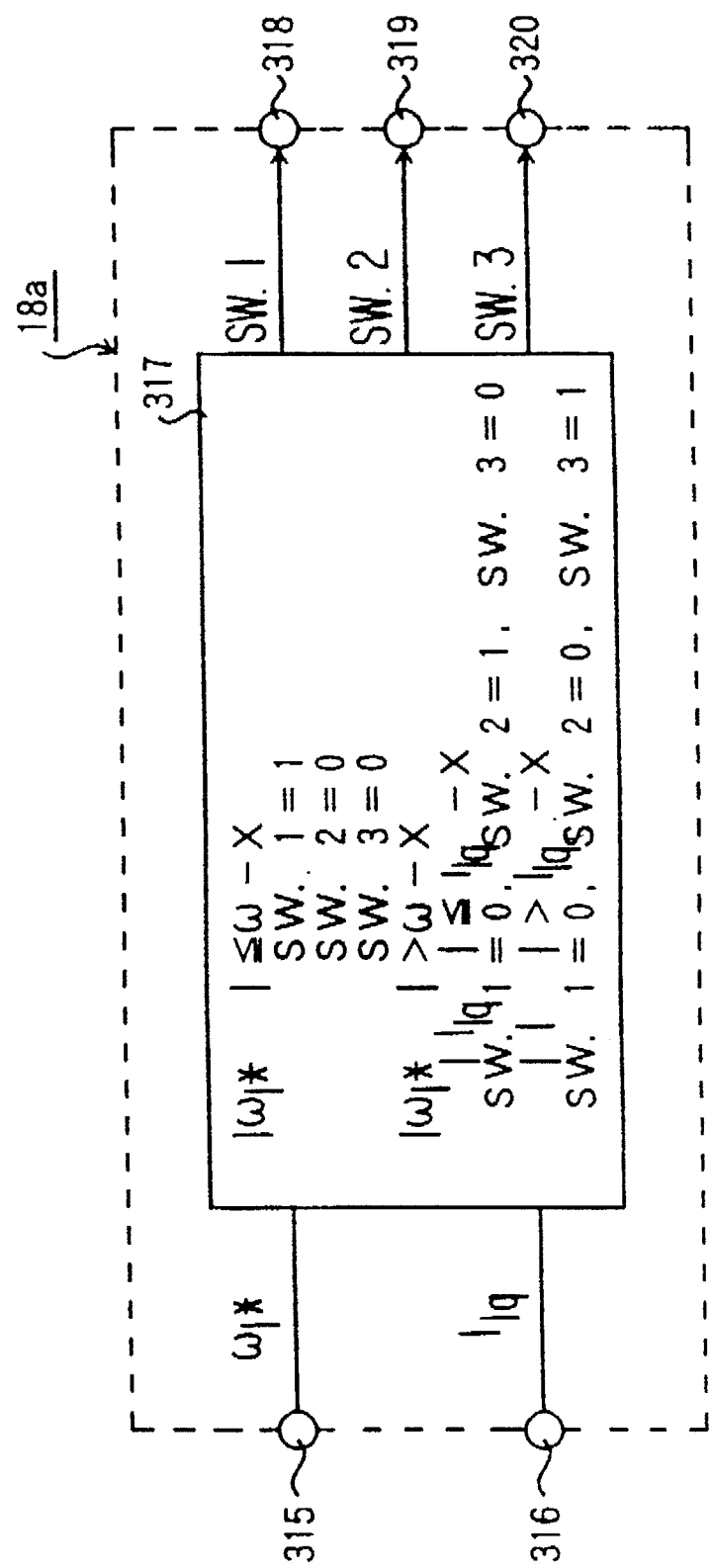
FIG. 19 is a block diagram showing the configuration of a correcting section control circuit according to Embodiment 3.

FIG. 19 is a block diagram showing the detailed configuration of the correcting section control circuit 18a described above. In this figure the correcting section control circuit 18a is implemented with an input terminal 315 connected to the frequency instruction generator 9, an input terminal 316 connected to the primary current element computing circuit 14, a correction signal generating circuit 317, and output terminals 318, 391, and 320, each outputting a correcting section control signal from the correction signal generating circuit 317.

A description will now be provided for a control system for an induction motor according to Embodiment 3. As described in relation to Embodiment 1, when $V_{1d}$ and $V_{1q}$ are determined using equations (21) to (23), the magnetic flux $\Phi_1$ is kept at a constant level according to the set value. As described above, in equations (21) to (23) are included set values for the primary resistance $R_1$, primary self-inductance $L_1$, leak factor $\sigma$ $(=1-M^2/(L_1L_2))$, which are circuit constants for a circuit in an induction motor. These factors can be corrected using the approach proposed previously (Japanese Patent Laid-Open No. 30792/1993) or the methods in Embodiment 1 and Embodiment 2. However, the correction is carried out using an error current outputted from the error current computing circuit 15a or 15b, as a result of which the correction becomes unstable if all the correcting circuits are simultaneously operated. Especially if correction is carried out in a region where the influence of the constant on the error current is small, if the error current is generated due to another constant, correction is made even up to the constant, and thus the corrected values may deviate significantly from the actual values.

In this step, by making use of the fact that when the primary frequency instruction $\omega_1$ is large, the voltage of $L_1^*\omega_1 I_{1d}$ of the second term on the right side of equation (21) for $V_{1q}$ becomes relatively large and the voltages of $R_1^*I_{1d}$ and $R_1^*I_{1q}$ of the first term in the right side of the equations for $V_{1d}$ and $V_{1q}$ become relatively small, and thus the operation for correcting the set value for the primary self-inductance as well as the set value for the leak factor is stopped during the operation in the low speed mode, and an operation for correcting the set value of the primary resistance during operation in a high speed mode is carried out. For this reason, in the low speed mode an error in setting the primary resistance, which is most influential on the primary magnetic flux in the induction motor, coinciding with the set value is selected and corrected, while in the high speed mode errors in setting the primary self-inductance and the leak factor are most influential for making the primary magnetic flux to coincide in an induction motor with the set value are corrected, so that stable and high precision control is achieved. Namely a correction signal as expressed by equation (34) is generated:

$$(|\omega_1^*| \leq \omega_x) \quad SW \cdot 1 = 1 \quad (34)$$
$$SW \cdot 2 = 0$$
$$SW \cdot 3 = 0$$
$$(|\omega_1^*| > \omega_x) \quad SW \cdot 1 = 0$$
$$SW \cdot 2 = 1$$
$$SW \cdot 3 = 1$$

Here, $\omega_x$ is a determination value for switching conditions.

Also, by making use of the fact that the factor $\sigma^* I_{1q}^2 / (I_{1d}^* - \sigma^* I_{1d})$ of the third term in the right side of equation (23) for $I_{err}$ is proportional to the square of $I_{1q}$, when the load is light, namely, when $I_{1q}$ is small, an operation for correcting the set value for the leak factor is stopped, while when the load is heavy or when $I_1q$ is large, an operation for correcting the set value for the primary self-inductance is stopped. For this reason, when the load is light, an error in setting the primary self-inductance, which is most influential for making the primary magnetic flux in the induction motor coincide with the set value, is selected and corrected, and on the contrary when the load is heavy, an error in setting the leak factor, which is most influential for making the primary magnetic flux in the induction motor coincide with the set value, is selected and corrected, so that stable and high precision control is obtained. Namely, the correction signal expressed by equation (35) is generated:

$$(|I_{1q}| \leq I_{1qx}) \quad SW \cdot 2 = 1 \quad (35)$$
$$SW \cdot 3 = 0$$
$$(|I_{1q}| > I_{1qx}) \quad SW \cdot 2 = 0$$
$$SW \cdot 3 = 1$$

Here, $I_{1qx}$ is a determination value for switching conditions.

Next, a description will be given of the operations in Embodiment 3.

As shown in FIG. 15, the correction voltage elements $\Delta V_{1d}$, $\Delta V_{1q}$ for the d axis and q axis are outputted from the correction voltage element computing circuit 7a. Namely, the primary resistance set value $R_1^*$ is outputted via the input terminal 150 from the primary resistance correcting circuit 10, and the correction value $\Delta \hat{R}_1$ for the primary resistance set value $R_1^*$ is outputted via the input terminal 151 from the primary resistance correcting circuit 11b. Then, the computation of equation (10) is executed, and the primary resistance estimated value $\hat{R}_1$ is outputted from the adder 152. Also, the error current $I_{err}$ is outputted via the input terminal 39 from the error current computing circuit 15b, and the d-axis element $I_{1d}$ and q-axis element $I_{1q}$, and each of the primary currents are outputted from the primary current element computing circuit 14.

As a result, the primary resistance set value $R_1^*$ from the input terminal 150 and a correction value $\Delta \hat{R}_1$ for the primary resistance set value $R_1$ inputted from the input terminal 151 are added in the adder 152, and the resultant value is outputted as an estimated value $\hat{R}_1$ for the primary resistance, computation of the right side of equation (26) for $V_{1d}$ is executed by the multiplier 153, amplifier 43, and adder 44, and the resultant value is outputted as the correction voltage element $\Delta V_{1d}$ for the d axis from the output terminal 51. On the other hand, computing of the third term in the right side of equation (26) for $V_{1q}$ is executed by the amplifier 45, factor unit 46, multiplier 47, and adder 48 from the error current element $I_{err}$, the primary frequency instruction $\omega_1^*$ outputted via the input terminal 40 from the frequency instruction generator 9, and the primary resistance estimated value $\hat{R}_1$ outputted from the adder 152, and computation of the first term on the right side of equation (26) for $V_{1q}$ is executed by the multiplier 154. Then, outputs from the adder 48 and factor units 49 are summed by the adder 50, when the voltage of the second term in the right side of equation (26) for $V_{1q}$, namely, a voltage element excluding the no-load voltage is outputted as the correction voltage element $\Delta V_{1q}$ for the q axis from the output terminal 52.

Then, by operation of the correcting section control circuit 18a shown in FIG. 19, the primary frequency instruction value $\omega^*$ is outputted via the input terminal 315 from the frequency instruction generator 9, and also the q-axis element $I_{1q}$ of the primary current is inputted via the input terminal 316 from the primary current element computing circuit 14 when the processing according to equation (34) and equation (35) above is executed by the correction signal generating circuit 317. SW.1, SW.2 and SW.3 are outputted as correcting section control signals for the primary resistance correcting circuit 11b, primary self-inductance correcting circuit 13b, and leak factor correcting circuit 17b from the output terminals 318, 319 and 320, respectively.

Furthermore, with the primary resistance correcting circuit 11b shown in FIG. 16, the correcting control signal SW.1 inputted via the input terminal 300 from the correcting section control circuit 18a is multiplied by the error current $I_{err}$ inputted via the input terminal 301 from the error current computing circuit 15b by the multiplier 302, and the resultant value is outputted as the correction value $\Delta \hat{R}_1$ for the primary resistant set value $R_1^*$ by the amplifier 303, amplification-type integrator 304, and adder 305 from the output terminal 306.

Similarly with the primary self-inductance correcting circuit 13b shown in FIG. 17, the correcting section control signal SW.2 inputted via the input terminal 307 from the correcting section control circuit 18a is multiplied by the error current $I_{err}$ inputted via the input terminal 308 from the error current computing circuit 15b by the multiplier 309, and the resultant value is outputted as the correction value $\Delta \hat{L}_1$ for the primary self-inductance set value $L_1^*$ by the amplifier 54, amplification-type integrator 55, and adder 56 from the output terminal 310.

Furthermore, with the leak factor correcting circuit 17b shown in FIG. 18, the correcting section control signal SW.3 inputted via the input terminal 311 from the correcting section control circuit 18a is multiplied by the error current $I_{err}$ inputted via the input terminal 312 from the error current computing circuit 15b by the multiplier 313, and the resultant value is outputted as the correction value $\Delta \hat{\sigma}$ for the leak factor set value $\sigma^*$ by the amplifier 220, amplification-type integrator 221 and adder 222 from the output terminal 314.

Figure 20:
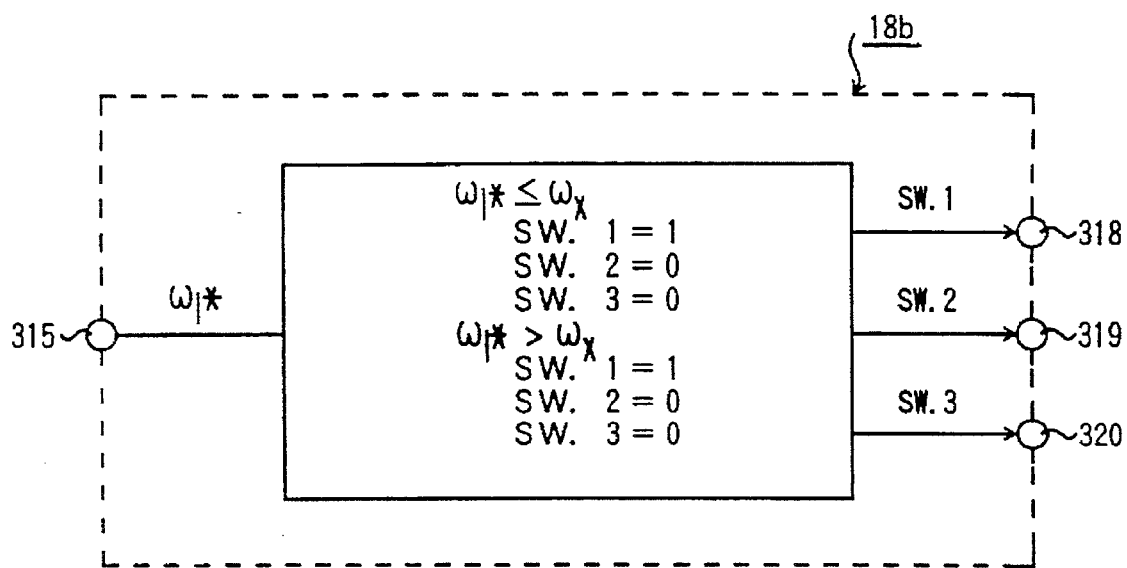
FIG. 20 is a block diagram showing the configuration of a correcting section control circuit according to a modification of Embodiment 3 above.

It should be noted that, in an alternative embodiment, the correcting section control circuit 18a shown in FIG. 19 may be replaced by the correcting control circuit 18b shown in FIG. 20. In the correcting section control circuit 18b shown in FIG. 18, the primary frequency instruction $\omega_1^*$ is inputted via the input terminal 315 from the frequency instruction generator 9, correcting section control signals for the primary resistance correcting circuit 11b, primary self-inductance correcting circuit 13b, and leak factor correcting circuit 17b are generated using equation (34), and the signals are outputted as SW.1, SW.2, and SW.3 from the output terminals 318, 319, and 320, respectively.

Figure 21:
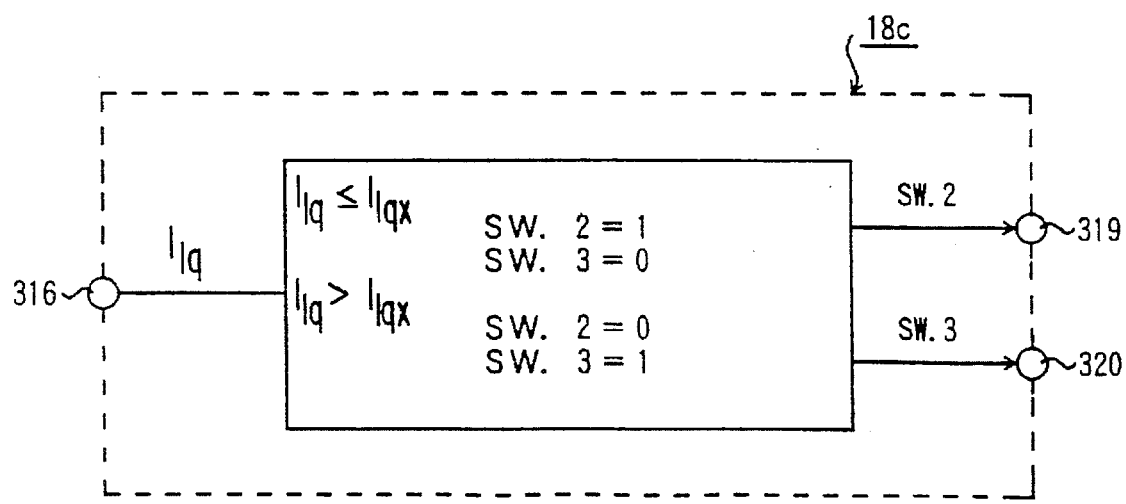
FIG. 21 is a block diagram showing the configuration of a correcting section control circuit according to a modification of Embodiment 3.

Furthermore, in another embodiment of the present invention, the correcting section control circuit 18a shown in FIG. 19 may be replaced by the correcting section control circuit 18c as shown in FIG. 21. In the correcting section control circuit 18c as shown in FIG. 21, the q-axis element $I_{1q}$ of the primary current is inputted via the input terminal 315 from the primary current element computing circuit 14, correcting section control signals for the primary self-inductance correcting circuit 13b and the leak factor correcting circuit 17b are generated using equation (35), and the signals are outputted as SW.2 and SW.3 from the output terminals 319, 320 respectively.

Figure 22:
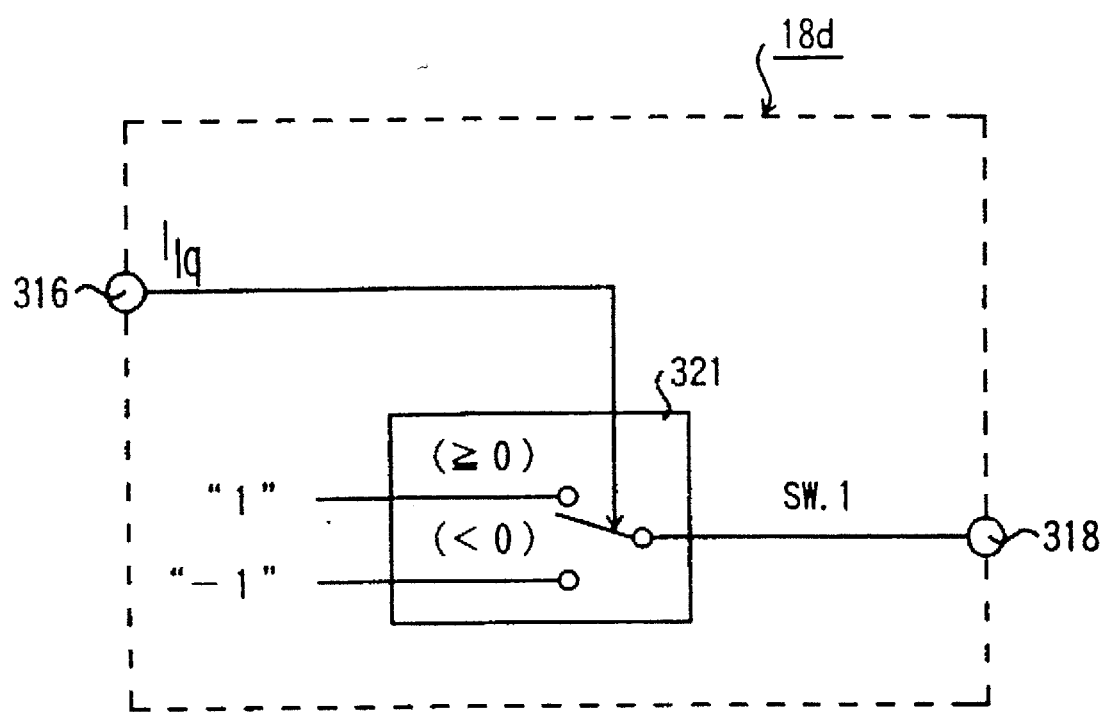
FIG. 22 is a block diagram showing configuration of a correcting section control circuit according to another modification of Embodiment 3.

Also, in the unit proposed by the present inventor previously, the primary resistance is corrected. However, no consideration was paid to the case of a regenerative load, and, as a result, correction of the primary resistance cannot be executed under stable conditions when a regenerative load is applied. To solve this problem, the correcting section control circuit 18a shown in FIG. 19 may be replaced by the correcting section control circuit 18d as shown in FIG. 22. In the correcting section control circuit 18d shown in FIG. 22, the q-axis element $I_{1q}$ of the primary current is inputted via the input terminal 316 from the primary current element computing circuit 14, and the correcting section control signal for the primary resistance correcting circuit 17b is generated by the switching circuit 321 so that the signal becomes "1" when the $I_{1q}$ is positive and "–1" when $I_{1q}$ is negative. The signal is outputted as SW.1 from the output terminal 318.

It should be noted that a correcting section control circuit may be formed by combining the correcting circuit control circuits 18b, 18c, and 18d shown in FIG. 20, FIG. 21, and FIG. 22 according to necessity. Also, it should be noted that in the above embodiment $I_{1u}$ or $I_{1v}$, namely, the output from the current detector 2, may be used in place of $I_{1q}$, which is the output from the primary current element computing circuit 14.

Figure 23:
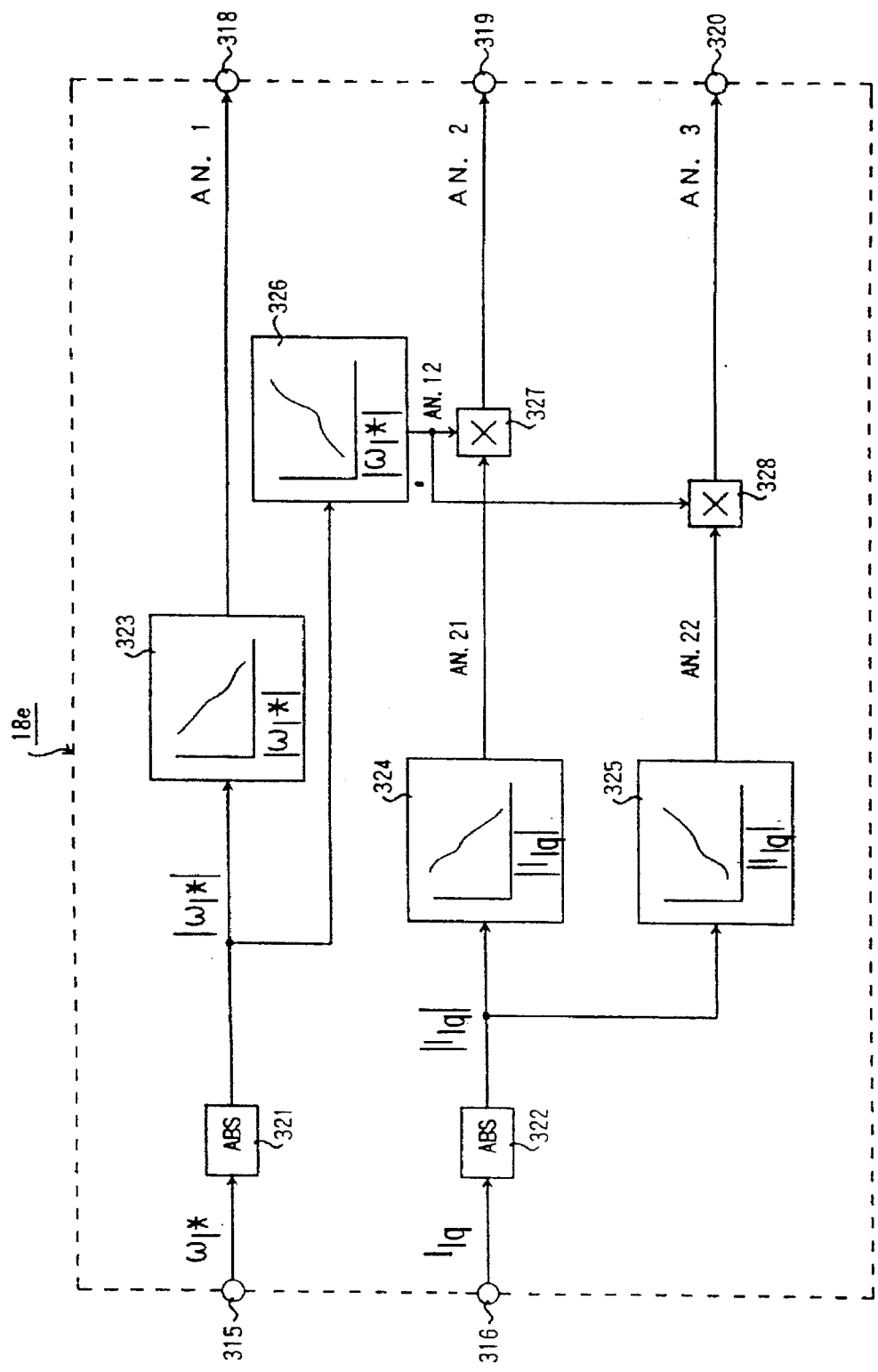
FIG. 23 is a block diagram showing a correcting section control circuit according to another modification of Embodiment 3.

Furthermore as an alternate embodiment, the output signals SW.1, SW.2, and SW.3 outputted from the correcting section control circuit 18a shown in FIG. 19 may not be digital signals of "1", "0", and "–1", but may be multi-valued signals having intermediate values, as shown in FIG. 23. In the block diagram in FIG. 21 showing the detailed configuration of the correcting section control circuit 18e, designated by reference numerals 315, 316 are input terminals, at 321, 322 absolute value circuits, at 323 to 326 function generators, at 327, 328 multipliers, and at 318 to 320 output terminals.

Next, a description will be given of the operations in this embodiment.

With the correcting section control circuit 18e shown in FIG. 23, the primary frequency instruction value $\omega_1^*$ is inputted via the input terminal 315 from the frequency instruction generator 9, and also the q-axis element $I_{1q}$ of the primary current is inputted via the input terminal 316 from the primary current element computing circuit 14. The absolute value of this primary frequency instruction $\omega_1^*$ is identified by an absolute value circuit 321, and the absolute value is outputted by the function generators 323, 326. Similarly, the absolute value of the q-axis element $I_{1q}$ of the primary current is derived by the absolute value circuit 322, and the absolute value is outputted from the function generators 324, 325.

Also, in the function generators 323 to 326, values corresponding to outputs from the absolute value circuits 321, 322 are outputted according to the function previously set. At first, the function generator 323 generates a signal AN.1 corresponding to the output from the absolute value circuit 321, and the signal AN.1 is outputted from the output terminal 318 to the primary resistance correcting circuit 11b. Then the function generator 326 outputs a signal AN.12 corresponding to the output from the absolute value circuit 321.

Furthermore, signals AN.21, AN.22, corresponding to outputs from the function generator 324 and function generator 325, respectively, are generated, and the signal AN.12 outputted from the function generator 326 is multiplied by the signal AN.21 outputted from the function generator 324 by the multiplier 327 to form a signal AN.2, which is outputted from the output terminal 319 to the primary self-inductance correcting circuit 13b. The signal AN.12 outputted from the function generator 326 is multiplied by the signal AN.22 outputted from the function generator 325 by the multiplier 328 to generate a signal AN.3, which is outputted from the output terminal 320 to the leak factor correcting circuit 17b.

Figure 24:
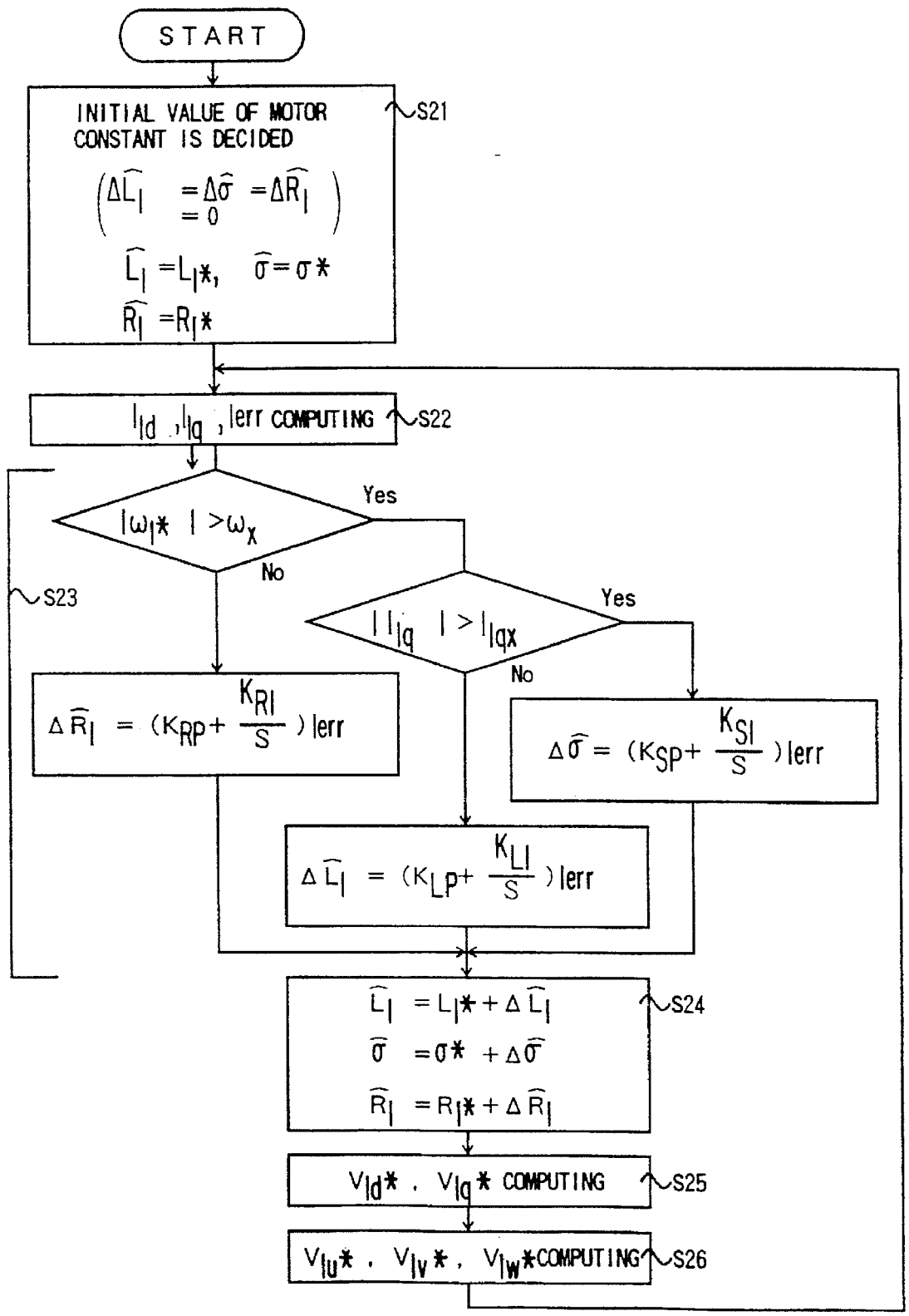
FIG. 24 is a flow chart showing an algorithm employed Embodiment 3.

FIG. 24 is a flow chart showing the algorithm employed in Embodiment 3 above, whose sequence is described below. At first, the correction value $\Delta \hat{L}_1$, correction value $\Delta \hat{\sigma}$ for the leak factor, and correction value $\Delta \hat{R}_1$ for the primary resistance are cleared to zero. Furthermore, an initial set value $L_1^*$ for the primary self-inductance, an initial set value $\sigma^*$ for the leak factor, and an initial set value $R_1^*$ for the primary resistance are set to the estimated values $\hat{L}_1$, $\hat{\sigma}$, and $\hat{R}_1$, respectively (Step S21). Then d-axis and q-axis elements $I_{1d}$, $I_{1q}$ of the primary current are computed using equations (27), (28) respectively. Furthermore, the error current $I_{err}$ is computed using equation (33) (Step S22).

Then, a set value to be corrected is selected by determination as to conditions using equations (34), (35). Then, a correction value for the selected set value is computed so that the error current $I_{err}$ is zeroed using any of equations (10), (25), and (31) (Step S23). It should be noted that a correction value for each of the set values not selected in this step is the same as that used at the previous time. Then, the correction values $\Delta \hat{L}_1$, $\Delta \hat{\sigma}$, and $\Delta \hat{R}_1$ are added to the initial set values $L_1^*$, $\sigma^*$, and $R_1^*$ respectively, and set as the estimated values $\hat{L}_1$, $\hat{\sigma}$, and $\hat{R}_1$, respectively (Step S24).

Furthermore, by using the estimated values obtained in Step S24 above, the d-axis element instruction $V_{1d}^*$ and q-axis element instruction $V_{1q}^*$ of the primary current are computed (Step S25), and furthermore the three-phase instructions $V_{1u}^*$, $V_{1v}^*$, $V_{1w}^*$ of the primary voltage are computed from the d-axis element instruction $V_{1d}^*$ and q-axis element instruction $V_{1q}^*$ of the primary voltage using equations (29) and (30) (Step S26).

It should be noted that the Steps S22 to S26 form a loop and each step is executed repeatedly, and that the sequence may be different. For instance, an algorithm in which Step S23 comes before Step S22 or Step S23 is executed prior to execution of Step S25 is allowable.

Figure 25:
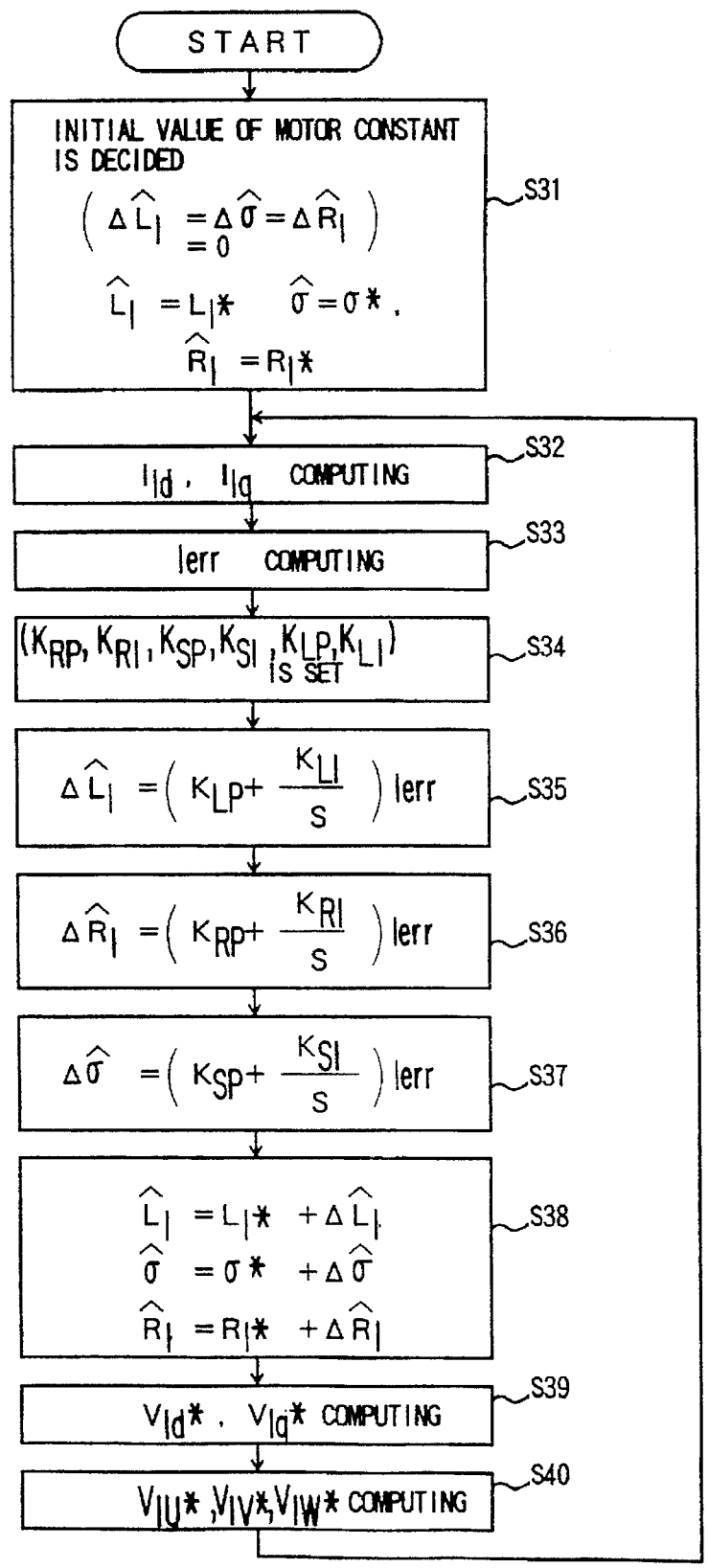
FIG. 25 is a flow chart showing operation of a control unit for an induction motor according to Embodiment 3 of the present invention.

Also, FIG. 25 is a flow chart showing operations in Embodiment 3. The operations from Steps S31 to S33 as well as those from Steps S35 to S40 are the same as described with reference to FIG. 24 above, and hence a further description thereof is omitted. Operations in Step S33 ($K_{RP}$, $K_{R1}$, $K_{SP}$, $K_{S1}$, $K_{cp}$, $K_{c1}$) are set by the correcting section control circuit 18a.

Next, a description will be given for Embodiment 4 of the present invention.

Figure 26:
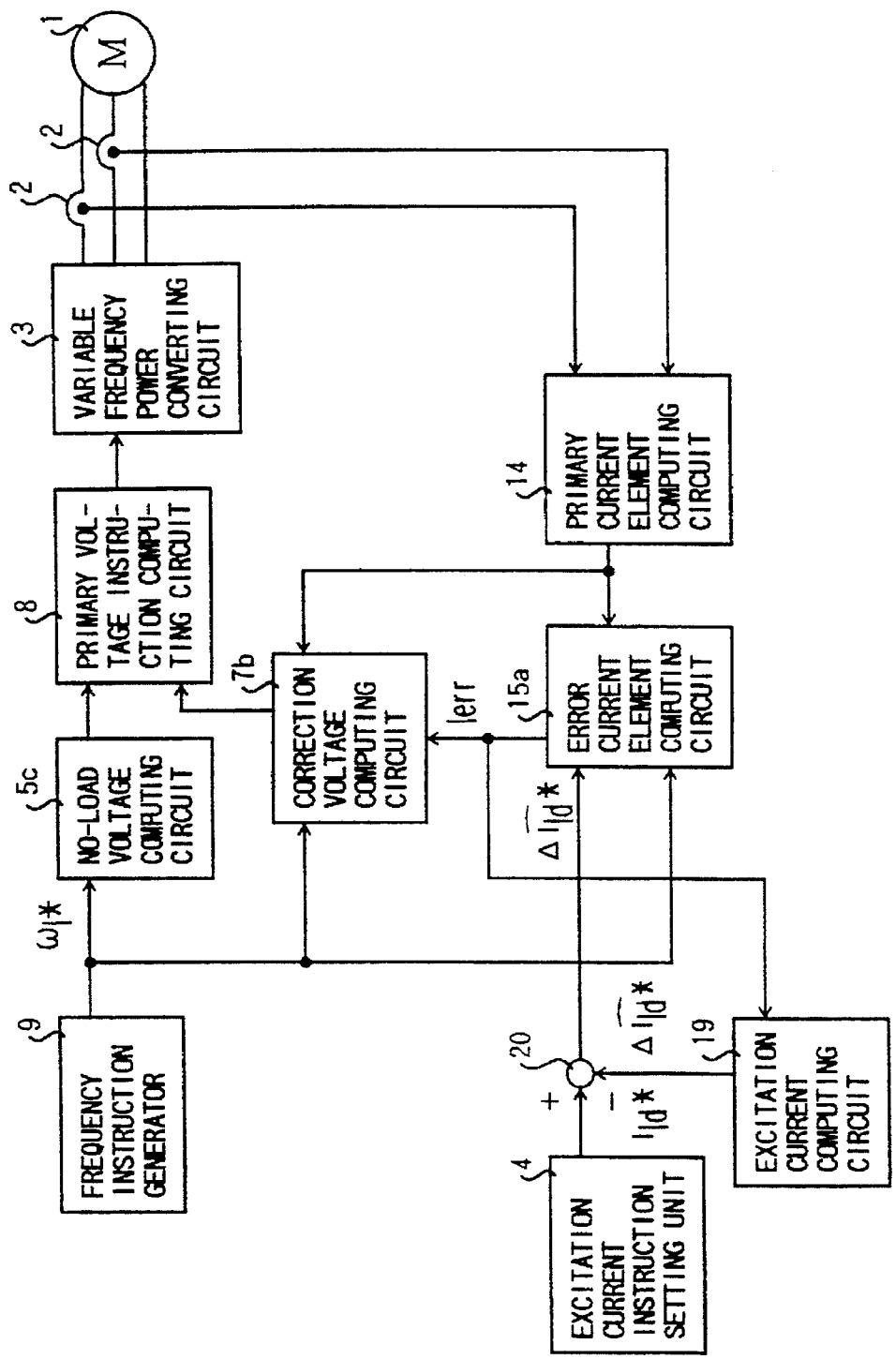
FIG. 26 is a block diagram showing general configuration of a control unit for an induction motor according to Embodiment 4 of the present invention.

FIG. 26 is a block diagram showing the general configuration of Embodiment 4. In this figure designated at reference numeral 1 is an induction motor, at 2 a current detector, at 3 a variable frequency power converting circuit, at 4 an excitation current instruction setting unit, at 5c a no-load voltage computing circuit, at 7b a correction voltage computing circuit, at 8 a primary voltage instruction computing circuit, at 9 a frequency instruction generator, at 14 a primary current element computing circuit, at 15a an error current computing circuit, at 19 an excitation current instruction correcting circuit, and at 20 a subtracter.

FIG. 27 is a block diagram showing the detailed configuration of the no-load voltage computing circuit 5c described above. In this figure, the no-load voltage computing circuit 5c has an input terminal 410 connected to the frequency instruction generator 9, a factor unit 411, and an output terminal 412.

FIG. 28 is a block diagram showing the detailed configuration of the excitation current instruction correcting circuit 19 described above. In this figure the excitation current instruction correcting circuit 19 has an input terminal 413 connected to the error current computing circuit 15a, an amplifier 414, an amplification-type integrator 415, an adder 416, and an output terminal 417.

Next, a description is provided of a control system for an induction motor according to Embodiment 4 of the present invention.

As described in relation to Embodiment 1 above, when $V_{1d}$ and $V_{1q}$ are obtained using equations (21) to (23), the primary magnetic flux $\Phi_1$ is kept at a constant level according to the set value. Also, as described above, in equation (21) is included a set value for the primary self-inductance $L_1$, which is a circuit constant for the induction motor. An error in setting this primary self-inductance can be corrected using the method of Embodiment 1 of the present invention. However, if the primary self-inductance $L_1$ is corrected and becomes larger than the set value $L_1^*$, $\hat{L}_1\omega_1 I_{1d}^*$ (the second term in the right side of equation (26) for the no-load voltage $V_{1q}^*$) becomes larger than $L_1^*\omega_1 I_{1d}^*$, which is the no-load voltage set value computed with the set value $L_1^*$ for the original self-inductance. If this no-load voltage is larger than the original set value, voltage shortage occurs and control becomes unstable. Thus, $V_{1d}^*$ and $V_{1q}^*$ are controlled as indicated by equation (36):

$$V_{1d}=R_1^*I_{1d}+K_{cd}I_{err}$$

$$V_{1q}=R_1^*I_{1q}+Ka\omega_1+(K_0\omega_1+K_{cq})I_{err} \qquad (36)$$

Here, $Ka=L_1^*I_{1d}^*$.

By making use of the fact that when there is an error between a set value for the primary self-inductance $L_1$ and the actual value, the error current $I_{err}$ expressed by equation (23) will never become zero, $I_{err}$ is subjected to proportionating and integration according to a preset gain, and the resultant value is computed as the correction value $\Delta\hat{I}_{1d}$ for the excitation current instruction $I_{1d}^*$. Namely, the correction value $\Delta\hat{I}_{1d}$ for the excitation current instruction $I_{1d}^*$ is computed using equation (37), and then $I_{1d}^*$ is added to obtain the corrected excitation current instruction value $\hat{I}_{1d}$ as shown in equation (38):

$$\Delta\hat{I}_{1d}=(K_P+K_I/S)I_{err} \qquad (37)$$

$$\hat{I}_{1d}^*=I_{1d}^*+\Delta\hat{I}_{1d}^* \qquad (38)$$

Furthermore, $I_{1d}^*$ in equation (23) used to obtain the error current $I_{err}$ is substituted into the expression for the corrected excitation current instruction value $\hat{I}_{1d}$ obtained using equation (38). Thus, equation (39) is obtained:

$$I_{err}=\hat{I}_{1d}^*-I_{1d}+\sigma^*I_{1q}^2/(\hat{I}_{1d}^*-\sigma^*I_{1d}) \qquad (39)$$

With the control system of Embodiment 4 as described above, even if there is an error in setting the primary self-inductance, correction is automatically executed in the state where the no-load voltage is kept at a constant level, so that the primary flux $\Phi_1$ is always controlled at a constant level. For this reason, voltage shortage will never occur, and excellent control of an induction motor can be realized.

Figure 29:
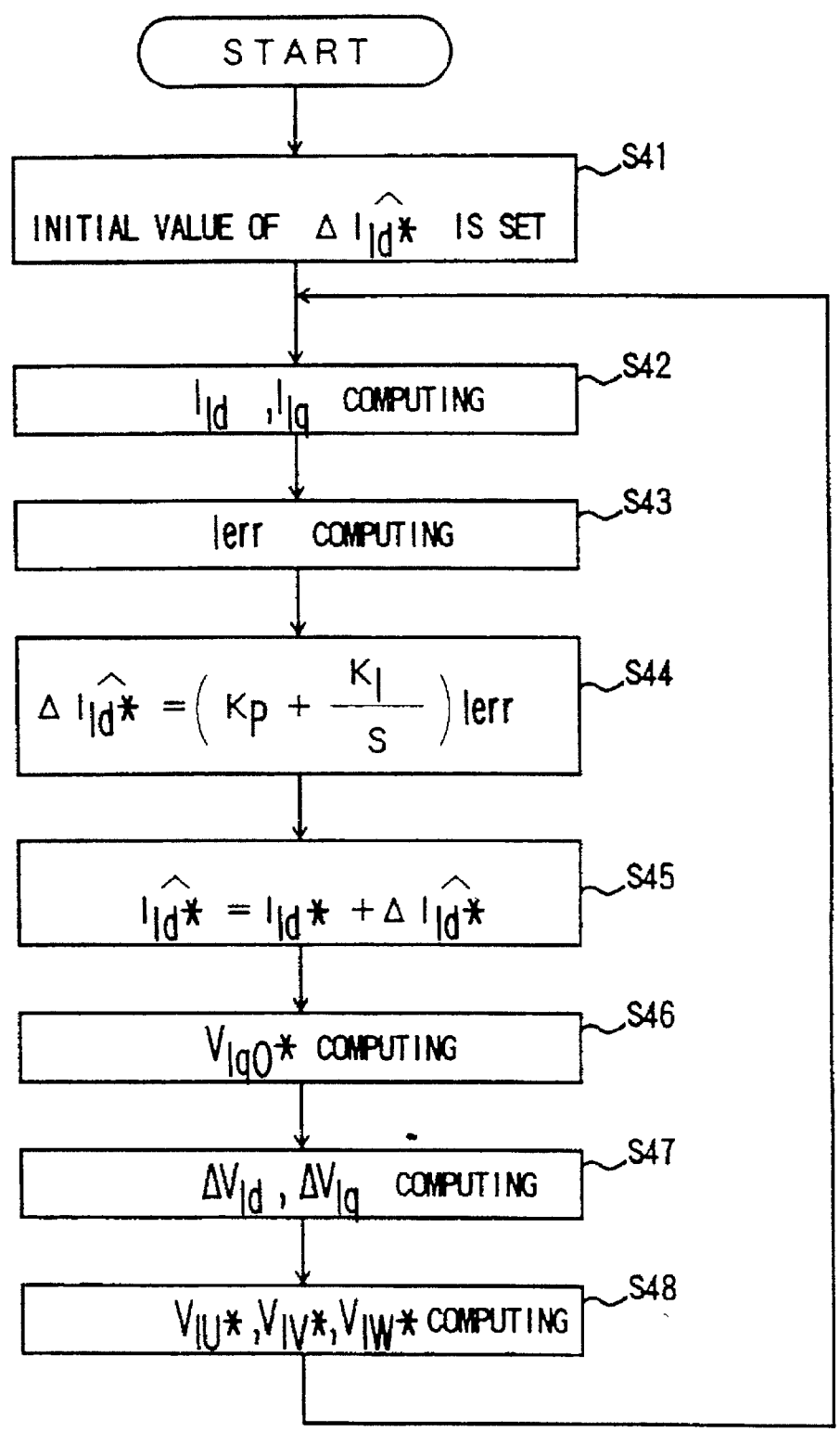
FIG. 29 is a flow chart showing operation of a control unit for an induction motor according to Embodiment 4.
Figure 30:
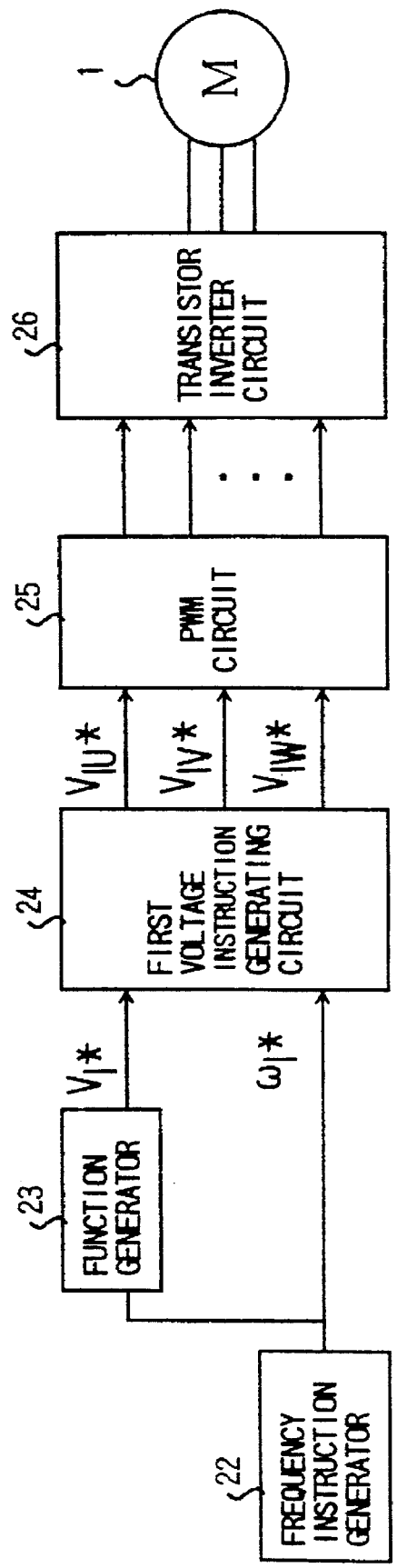
FIG. 30 is a block diagram showing general configuration of a conventional type of control unit for an induction motor.
Figure 31:
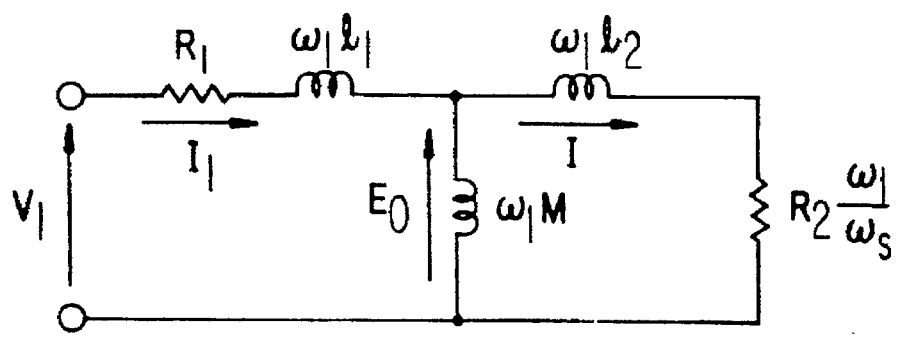
FIG. 31 is a T-shaped equivalent circuit per phase of an induction motor.
Figure 32:
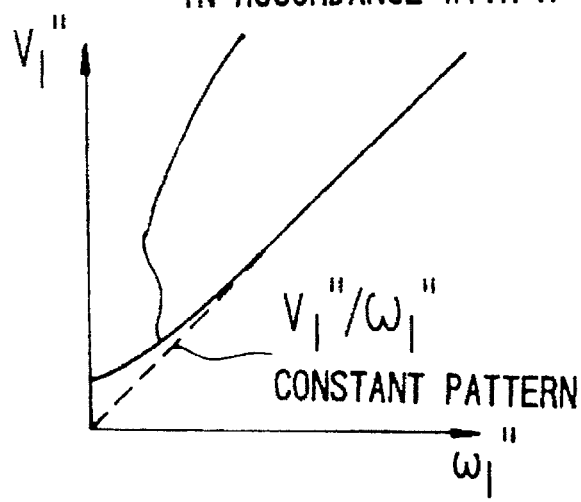
FIG. 32 is a graph showing a pattern in a function generator in a conventional type of control unit for an induction motor.

The operations in Embodiment 4 described above will be discussed with reference to the flow chart shown in FIG. 29 and to FIG. 27 and FIG. 28.

At first, the initial value of $\Delta\hat{I}_{1d}$ is set (Step S41). Next, in the no-load voltage computing circuit 5c shown in FIG. 27, the primary frequency instruction value $\omega_1^*$ is outputted via the input terminal 410 from the frequency instruction generator 9, the output subjected to multiplication by a fixed factor in the factor unit 411, and then outputted as $V_{1d0}^*$ from the output terminal 412.

Also, in the excitation current instruction correcting circuit 19 shown in FIG. 28, the error current $I_{err}$ inputted via the input terminal 413 from the error current computing circuit 15a is subjected to computation using equation (37) by the amplifier 414, amplification-type integrator 415, and adder 416, and the resultant value is outputted as the correction value $\Delta\hat{I}_{1d}^*$ for the excitation current instruction $I_{1d}^*$ from the output terminal 417 (Step S44).

Furthermore, the correction value $\Delta\hat{I}_{1d}$ for the excitation current instruction $I_{1d}^*$ from the excitation current instruction correcting circuit 19 is subtracted by the subtracter 20 from the excitation current instruction $I_{1d}^*$ outputted from the excitation current instruction setting unit 40, and the resultant value is outputted as the corrected excitation current instruction value $\hat{I}_{1d}^*$ to the error current computing circuit 15a (Step S45). Steps S42, S43 and S46–S48 are the same operations as discussed with respect to the previously described embodiments, and thus a further description thereof is omitted.

It should be noted that the present invention is not limited to the configurations of Embodiments 1 to 4 above, and that any control unit for an induction motor and control method therefor in which any of the means according to the present invention are employed can achieve the same effects as in the above embodiments.

Furthermore, each of the means according to the present invention can achieve the same effect by either using hardware or software.

As described above, a control unit for an induction motor according to the present invention is constructed and arranged so that a set value for the primary self-inductance is corrected using an error current so that the actual value of the primary magnetic flux generated with an induction motor will become zero when it coincides with the set value, and the primary magnetic flux in the induction motor is corrected to the set value using the corrected primary self-inductance value. For this reason, stable and high precision control always can be executed, even if there is an error between a set value for the primary self-inductance, including a design value, and the actual value thereof.

Furthermore, even for control for changing an excitation current instruction such as variable excitation or weak excitation, it is not required to measure and determine a change curve of the primary self-inductance due to magnetic saturation and to store the measured value, so that such a complicated effort is not required, while always stable and high prevision control can be achieved.

A control unit for an induction motor and control method therefor according to the present invention is constructed and arranged so that a set value for the leak factor is corrected using an error current so that the actual value of the primary magnetic flux generated with the induction motor will become zero when it coincides with the set value, and the primary magnetic flux in the induction motor is controlled by using the corrected leak factor value so that the actual value of the leak factor will coincide with the set value. For this reason, stable and high precision control can be achieved even when there is an error between a set value for the leak factor, including the design value, and the actual value.

Furthermore, if the leak factor changes due to influences of magnetic saturation, it has been difficult to measure the change curve of the leak factor, and the change curve of the leak factor cannot be stored in a memory, which deteriorates stability and precision of control. However, by correcting the leak factor according to the present invention, stability and high precision can be achieved.

A control unit for an induction motor and control method therefor according to the present invention is constructed and arranged so that set values for the primary resistance, primary self-inductance and leak factor are corrected using an error current so that the actual value of the primary magnetic flux generated within an induction motor will become zero when the actual value coincides with the set value, the primary magnetic flux in the induction motor is controlled using the corrected values for the primary resistance, primary self-inductance, and leak factor so that the primary magnetic flux in the induction motor will coincide with the set value. Furthermore, the correcting operations are controlled according to the primary current and primary frequency in the induction motor, respectively, and for this reason the primary magnetic flux in the induction motor coincides with the set value, even when there is an error between a set value for, for instance, the primary self-inductance or the leak factor, and the actual value thereof, so that a set error most influential for effecting coincidence between the primary magnetic flux in the induction motor and the set value is selected for correction, and always stable and high precision control can be achieved.

A control unit for an induction motor and control method therefor according to the present invention is constructed and arranged so that operations for correcting a set value for the primary self-inductance and a set value for the leak factor are stopped during operation in a low speed mode, and an operation for correcting a set value for the primary resistance is stopped during operation in a high speed mode. For this reason, a set error most influential for effecting coincidence between the primary magnetic flux in the induction motor and the set value during operation in a low speed mode is selected for correction, while during operation in a high speed mode a set error influential for effecting coincidence between the primary magnetic flux in the induction motor and the set value is selected for correction. Thus, always stable and high precision control can be achieved.

A control unit for an induction motor and control method therefor according to the present invention is constructed and arranged so that a determination as to whether a load is light or heavy is executed according to the primary current in an induction motor, an operation for correcting the set value for the leak factor is stopped when the load is light and an operation for correcting the set value for the primary self-inductance is stopped when the load is heavy. For this reason, when the load is light, a set error for the primary self-inductance most influential for effecting coincidence between the primary magnetic flux in the induction motor and the set value thereof is selected for correction, and on the contrary when the load is heavy, a set error for the leak factor most influential for effecting coincidence between the primary magnetic flux in the induction motor and the set value thereof is selected for correction. Thus, always stable and high precision control can be achieved.

A control unit for an induction motor and control method therefor according to the present invention is constructed and arranged so that a determination as to whether a load is a power load or a regenerative load is executed according to the primary current in an induction motor, and the polarity of the primary resistance correction gain is inverted when the load is a regenerative one. For this reason, stable and high precision control can be achieved even during operation under a regenerative load.

A control unit for an induction motor and control method therefor according to the present invention is constructed and arranged so that correction gains for the primary resistance correcting means, primary self-inductance correcting means, and leak factor correcting means are controlled according to functional patterns previously set according to or computed by using the primary current and the primary frequency instruction value in an induction motor. For this reason, during operation in a low speed mode a set error for the primary resistance most influential for effecting coincidence between the magnetic flux in the induction motor and the set value thereof is preferentially selected for correction, and on the contrary during operation in a high speed mode a set error for the primary self-inductance as well as for the leak factor is preferentially selected for correction. Furthermore, when the load is light a set error for the primary self-inductance most influential for effecting coincidence between the magnetic flux in the induction motor and the set value is preferentially selected for correction, and on the contrary when the load is heavy a set error for the leak factor most influential for effecting coincidence between the primary magnetic flux and the set value is preferentially selected for correction. Thus, always stable and high precision control can be achieved.

A control unit for an induction motor and control method therefor according to the present invention is constructed and arranged so that a set value for the excitation current is corrected by using an error current so that an actual value of the primary magnetic flux generated in an induction motor will become zero when the actual value coincides with the set value and the primary magnetic flux in the induction motor is controlled using the corrected excitation current set value, so that the actual value coincides with the set value thereof. For this reason, even when there is an error between the set value for the primary self-inductance and the actual value thereof, the excitation current select value can be corrected with the no-load voltage kept at a constant level. Thus, voltage shortage will never occur, and always stable and high precision control can be achieved.

Although the invention has been described with respect to specific embodiments for a complete and clear disclosure, the appended claims are not to be thus limited, but are to be construed as embodying all modifications and alternative constructions that may occur to one skilled in the art which fairly fall within the basic teaching herein set forth.

What is claimed is:

1. A control unit for an induction motor comprising:
   a current detecting unit for detecting a primary current in an induction motor;
   a primary current element computing unit for computing primary current elements each having phases differing by 90 degrees from each other from the primary current detected by said current detecting unit and from a primary frequency instruction value;
   an error current computing unit into which said primary frequency element instruction value, excitation current instruction value, and output from said primary current element computing unit are inputted and which computes an error current in such a manner that an actual value of the primary magnetic flux generated in said induction motor will become zero when the actual value coincides with the set value thereof;

a primary self-inductance correcting unit into which an output from said error current computing unit is inputted and which computes a correction value for a primary self-inductance set value, which is a circuit constant for said induction motor;

a correction voltage computing unit into which said primary frequency instruction value, an output from said primary current element computing unit, and an output from said error current computing unit are inputted and which computes a correction voltage to make a value of said error current closer to zero;

a no-load voltage correcting unit into which said primary frequency instruction value, said excitation current instruction value, and an output from said primary self-inductance correcting unit are inputted and which outputs a no-load voltage instruction value for said induction motor; and a primary voltage instruction computing unit into which said primary frequency instruction value, said no-load voltage instruction value, and said correction voltage are inputted and which computes a primary voltage instruction value for said induction motor and outputs the computed value to a variable frequency power converting unit.

2. A control method for an induction motor comprising the steps of:

detecting a primary current in an induction motor;

computing primary current elements each having a phase differing by 90 degrees from each other from the primary current detected and from a primary frequency instruction value;

computing an error current in such a manner that an actual value of the primary magnetic flux generated in said induction motor will become zero when the actual value coincides with the set value thereof in accordance with said primary frequency element instruction value, said excitation current instruction value and said primary current element;

computing a correction value for the primary self-inductance set value which is a circuit constant for said induction motor in accordance with said error current;

computing a correction voltage to make a value of said error current closer to zero in accordance with said primary frequency instruction value, said primary current element and said error current;

outputting a no-load voltage instruction value for said induction motor by inputting said primary frequency instruction value, said excitation current instruction value and said correction value of said primary self-inductance setting value; and computing a primary voltage instruction value for said induction motor in accordance with said primary frequency instruction value, said no-load voltage instruction value and said correction voltage.

3. A control unit for an induction motor comprising:

a current detecting unit for detecting a primary current in an induction motor; a primary current element computing unit for computing primary current elements each having a phase differing by 90 degrees from each other from the primary current detected by said current detecting unit and from a primary frequency instruction value;

a no-load voltage computing unit into which said primary frequency instruction value and said excitation current instruction value are inputted and which outputs a no-load voltage instruction value for said induction motor;

an error current computing unit into which said primary frequency element instruction value, excitation current instruction value, output from said primary current element computing unit, and a correction value for the leak factor set value are inputted and which computes an error current so that an actual value of the primary magnetic flux generated in said induction motor will become zero when the actual value coincides with the set value thereof;

a leak factor correcting unit into which an output from said error current correcting unit is inputted and which computes a correction value for the leak factor set value;

a correction voltage computing unit into which said primary frequency instruction value, an output from said primary current element computing unit, and an output from said error current computing unit are inputted and which computes a correction voltage to make a value of said error current closer to zero; and a primary voltage instruction computing unit into which said primary frequency instruction value, said no-load voltage instruction value, and said correction voltage are inputted and which computes a primary voltage instruction value for said induction motor and outputs the computed value to a variable frequency power converting unit.

4. A control method for an induction motor comprising the steps of:

detecting a primary current in an induction motor;

computing primary current elements each having a phase differing by 90 degrees from each other from the primary current detected and from a primary frequency instruction value;

outputting a no-load voltage instruction value for said induction motor by inputting said primary frequency instruction value and said excitation current instruction value;

computing an error current so that an actual value of the primary magnetic flux generated in said induction motor will become zero when the actual value coincides with the set value thereof in accordance with said primary frequency element instruction value, said excitation current instruction value, said primary current element and a correction value for a leak factor set value;

computing a correction value for said leak factor set value in accordance with said error current;

computing a correction voltage to make a value of said error current closer to zero in accordance with said primary frequency instruction value, said primary current element, and said error current; and computing a primary voltage instruction value for said induction motor in accordance with said primary frequency instruction value, said no-load voltage instruction value and said correction voltage.

5. A control unit for an induction motor comprising:

a current detecting unit for detecting a primary current in an induction motor;

a primary current element computing unit for computing primary current elements each having a phase differing by 90 degrees from each other from the primary current detected by said current detecting unit as well as from the primary frequency instruction value;

an error current computing unit into which an output from said primary current element computing unit and the primary frequency instruction value, excitation current instruction value, and correction value of set values for a leak factor are inputted and which computes an error current so that an actual value of the primary magnetic flux generated in said induction motor will become zero when the actual value coincides with the set value;

a primary resistance correcting unit into which an output from said error current computing unit is inputted and which computes a correction value for the primary resistance set value, which is a circuit constant for said induction motor;

a primary self-inductance correcting unit into which an output from said error current computing unit is inputted and which computes a correction value for the primary self-inductance set value, which is a circuit constant for said induction motor;

a leak factor correcting unit into which output from said error current computing unit is inputted and which computes a correction value for the leak factor set value, which is a circuit constant for said induction motor;

a correction voltage computing unit into which said primary frequency instruction value, said error current computing unit, an output from said primary current element computing unit, and an output from said primary resistance correcting unit are inputted and which computes a correction voltage to make a value of said error current closer zero;

a no-load voltage computing unit into which said primary frequency instruction value, said excitation current instruction value, and output from said primary self-inductance correcting unit are inputted and which outputs a no-load voltage instruction value for said induction motor;

a correcting section control unit for controlling said primary resistance correcting unit, said primary self-inductance correcting unit, and said leak factor correcting unit; and a primary voltage instruction computing unit into which said primary frequency instruction value, said no-load voltage instruction value, and said correction voltage are inputted and which computes a primary voltage instruction value for said induction motor and outputs the computed value to a variable frequency power converting unit.

6. A control unit for an induction motor according to claim 5, wherein said correcting section control unit, operating in response to said primary frequency instruction value as an input, stops operations of said primary self-inductance correcting unit and said leak factor correcting unit when said primary frequency instruction value is small, and stops operations of said primary resistance correcting unit when said primary frequency instruction value is large.

7. A control unit for an induction motor according to claim 5, wherein said correcting section control unit makes a determination as to whether a load is light or heavy according to an output from said primary current element computing unit, stops operations of said leak factor correcting unit when a load is light, and stops operations of said primary self-inductance correcting unit when the load is heavy.

8. A control unit for an induction motor according to claim 5, wherein said correcting section control unit inverts a polarity of a correction gain for said primary resistance correcting unit according to an output from said primary current element computing unit.

9. A control unit for an induction motor according to claim 5, wherein said correcting section control unit controls correction gains for said primary resistance correcting unit, said primary self-inductance correcting unit, and said leak factor correcting unit depending on outputs from said primary frequency instruction unit and said primary current element computing unit, and according to a gain function set previously.

10. A control method for an induction motor comprising the steps of:

detecting a primary current in an induction motor;

computing primary current elements each having a phase differing by 90 degrees from each other from the primary current detected and from the primary frequency instruction value;

computing an error current so that an actual value of the primary magnetic flux generated in said induction motor will become zero when the actual value coincides with the set value in accordance with said primary current element, primary frequency instruction value, excitation current instruction value, and correction value of set value for leak factor;

computing a correction value for the primary resistance set value, which is a circuit constant for said induction motor, in accordance with said error current;

computing a correction value for the primary self-inductance set value which is a circuit constant for said induction motor in accordance with said error current;

computing a correction value for the leak factor set value, which is a circuit constant for said induction motor, in accordance with said error current;

computing a correction voltage to make a value of said error current closer to zero in accordance with said primary frequency instruction value, said error current, said primary current element and a correction value of said primary resistance correction value;

outputting a no-load voltage instruction value for said induction motor by inputting said primary frequency instruction value, said excitation current instruction value and a correction value of said primary self-inductance setting value controlling said primary correction value of said primary resistance setting value, correction value of said primary self-inductance setting value and a correction value of said leak factor setting value; and computing a primary voltage instruction value for said induction motor in accordance with said primary frequency instruction value, said no-load voltage instruction value and said correction voltage.

11. A control unit for an induction motor comprising:

a current detecting unit for detecting a primary current in an induction motor;

a primary current element computing unit for computing primary current elements each having a phase by 90 degrees from each other from the primary current detected by said current detecting unit as well as from the primary frequency instruction value;

an error current computing unit into which said primary frequency instruction value, an output from said primary current element computing unit, and a corrected excitation current instruction value are inputted, and which computes an error current so that an actual value of the primary magnetic flux generated in said induction motor will become zero when the actual value coincides with the set value;

an excitation current instruction correcting unit into which an output from said error current computing unit is inputted and which computes a correction value for the excitation current instruction value;

a correction voltage computing unit into which said primary frequency instruction value and an output from said error current computing unit are inputted and which computes a correction value to make closer a value of said error current to zero;

a no-load voltage computing unit into which said primary frequency instruction value is inputted and which outputs a no-load voltage instruction value for said induction motor is outputted; and a primary voltage instruction computing unit into which said primary frequency instruction value, said no-load voltage instruction value, and said correction voltage are inputted and which computes a primary voltage instruction value for said induction motor and outputs the computed value to a variable frequency power converting unit.

12. A control method for an induction motor comprising the steps of:

detecting a primary current in an induction motor;

computing primary current elements each having a phase by 90 degrees from each other from the primary current detected as well as from the primary frequency instruction value;

computing an error current so that an actual value of the primary magnetic flux generated in said induction motor will become zero when the actual value coincides with the set value in accordance with said primary frequency instruction value, said primary current element and corrected excitation current instruction value;

computing a correction value for the excitation current instruction value in accordance with said error current;

computing a correction value to make a value of said error current closer to zero in accordance with said primary frequency instruction value and said error current;

outputting a no-load voltage instruction value for said induction motor by inputting said primary frequency instruction value; and computing a primary voltage instruction value for said induction motor in accordance with said primary frequency instruction value, said no-load voltage instruction value and said correction voltage.

* * * * *